United States Patent [19]

Peiffer et al.

[11] Patent Number: 6,100,224
[45] Date of Patent: Aug. 8, 2000

[54] COPOLYMERS OF ETHYLENE α-OLEFIN MACROMERS AND DICARBOXYLIC MONOMERS AND DERIVATIVES THEREOF, USEFUL AS ADDITIVES IN LUBRICATING OILS AND IN FUELS

[75] Inventors: Dennis G. Peiffer, Annandale, N.J.; Kenneth Lewtas, Tervuren-moorsel, Belgium; Robert D. Lundberg, Williamsburg, Va.; Pamela J. Wright, Easton, Pa.; Antonio G. Lazarus, Robbinsville, N.J.; Jacob Emert, Brooklyn, N.Y.

[73] Assignee: Exxon Chemical Patents Inc, Linden, N.J.

[21] Appl. No.: 08/942,146

[22] Filed: Oct. 1, 1997

[51] Int. Cl.⁷ .................... C10M 145/00; C10M 149/06
[52] U.S. Cl. .................... 508/235; 525/301; 525/322; 525/337; 525/380; 508/466; 508/348
[58] Field of Search .................. 508/235, 466; 525/301, 322, 337, 348, 380

[56] References Cited

U.S. PATENT DOCUMENTS

| | | | |
|---|---|---|---|
| 2,422,278 | 6/1947 | Young et al. | 252/59 |
| 2,542,542 | 2/1951 | Lippincott et al. | 252/56 |
| 3,560,455 | 2/1971 | Hazen et al. | 260/78.5 |
| 3,580,893 | 5/1971 | Hellman | 260/78.5 T |
| 4,089,794 | 5/1978 | Engel et al. | 252/51.5 A |
| 4,505,834 | 3/1985 | Papay et al. | 252/51.5 A |
| 4,693,838 | 9/1987 | Varma et al. | 252/51.5 R |
| 4,704,491 | 11/1987 | Tsutsui et al. | 585/10 |
| 5,112,507 | 5/1992 | Harrison | 252/51.5 A |
| 5,175,225 | 12/1992 | Ruhe, Jr. | 526/272 |
| 5,229,022 | 7/1993 | Song et al. | 252/56 R |
| 5,266,223 | 11/1993 | Song et al. | 252/51.5 A |
| 5,275,747 | 1/1994 | Gutierrez et al. | 252/51.005 A |
| 5,433,875 | 7/1995 | Rollin et al. | 252/51.5 R |
| 5,565,528 | 10/1996 | Harrison et al. | 525/327.6 |
| 5,578,237 | 11/1996 | Emert et al. | 508/454 |
| 5,616,153 | 4/1997 | Mike et al. | 44/331 |
| 5,616,668 | 4/1997 | Harrison et al. | 526/271 |
| 5,652,202 | 7/1997 | Adams | 508/235 |
| 5,674,819 | 10/1997 | Sivik et al. | 508/466 |
| 5,759,967 | 6/1998 | Song et al. | 508/466 |

FOREIGN PATENT DOCUMENTS

| | | | |
|---|---|---|---|
| 0 776 963 A1 | 6/1997 | European Pat. Off. | C10M 133/56 |
| 63-23904 | 2/1988 | Japan | C08F 8/46 |
| 5-59119 | 3/1993 | Japan | C08F 8/48 |
| 1 525 114 | 9/1978 | United Kingdom | C10M 1/28 |
| WO90/04627 | 5/1990 | WIPO | C10M 145/16 |
| WO90/04628 | 5/1990 | WIPO | C10M 149/06 |

Primary Examiner—Jacquelline V. Howard

[57] ABSTRACT

A copolymer comprising units of an unsaturated dicarboxylic monomer and an ethylene α-olefin macromer is disclosed. The macromer is an unsaturated ethylene α-olefin polymer comprising units of from ethylene and at least one α-olefin represented by the formula $CH_2=CHR^a$, wherein $R^a$ is a $C_1$ to $C_{18}$ linear alkyl group or a $C_3$ to $C_{18}$ branched alkyl group; the ethylene α-olefin polymer has a number average molecular weight of from about 500 to about 100,000; and at least about 30% of the unsaturation in the ethylene α-olefin polymer is terminal vinylidene. The copolymer has a carbon-carbon backbone and contains succinic groups and hydrocarbyl groups. The copolymer can be derivatized by reaction with nucleophilic reactants including monoamines, polyamines, monoalcohols, polyols, amino alcohols, reactant metal compounds and mixtures thereof. The derivatized copolymers can be post-treated (e.g., borated) with one or more post-treating agents (e.g., boric acid). The copolymer, its derivatives, and post-treated derivatives are useful as additives (e.g., dispersants and viscosity index improvers) in fuels and in lubricating oils.

36 Claims, 2 Drawing Sheets

COPOLYMERS OF ETHYLENE α-OLEFIN MACROMERS AND DICARBOXYLIC MONOMERS AND DERIVATIVES THEREOF, USEFUL AS ADDITIVES IN LUBRICATING OILS AND IN FUELS

FIELD OF THE INVENTION

The invention relates to copolymers of an unsaturated ethylene α-olefin ("EAO") polymer (alternatively referred to herein as an EAO "macromer") and an unsaturated dicarboxylic monomer, derivatives of the copolymers, and use of the copolymers and derivatives thereof as detergent and dispersant additives in fuels and in lubricating oils and as multifunctional viscosity index improver additives in lubricating oils.

BACKGROUND OF THE INVENTION

Multigrade lubricating oils employed in truck and passenger car internal combustion engines typically contain several types of additives, each imparting one or more essential properties to the oil. Dispersant additives are employed in lubricating oils to disperse and suspend sludge that is formed during engine operation. One widely used type of dispersant additive consists of a long chain hydrocarbon polymer chemically linked to a polar component, and is exemplified by polyalkenyl succinic anhydrides and their nitrogen-containing and ester derivatives. In particular, succinimide compositions obtained by reaction of polyamines with polyalkenyl succinic anhydrides have been commonly used as dispersant additives.

Polyalkenyl succinic anhydrides have typically been prepared by reacting a polyalkene having a number average molecular weight ("$\overline{M}_n$") of from about 500 to about 5,000 with an unsaturated dicarboxylic compound (typically maleic anhydride) at elevated temperature (the thermal ene process) or at elevated temperature in the presence of chlorine (the chloro process). The polyalkene reactant of choice has often been a conventional polyisobutene obtained from butene streams by cationic polymerization in the presence of an aluminum chloride catalyst. Exemplary thermal ene processes are described in U.S. Pat. No. 3,361,673 and U.S. Pat. No. 3,401,118, and exemplary chloro processes are described in U.S. Pat. No. 3,172,892, U.S. Pat. No. 3,215,707, EP-A-382450 and GB-A-1440219.

Ethylene α-olefin polymer substituted succinic anhydrides have also been disclosed as suitable intermediates for preparing dispersant additives. U.S. Pat. No. 5,229,022, for example, discloses nitrogen-containing and ester dispersants derived from EAO polymer-substituted succinic anhydrides that have been prepared via the thermal ene process and via the chloro process from EAO polymers with a $\overline{M}_n$ of about 300 to about 20,000 and having a high degree of terminal vinylidene unsaturation.

The polyalkenyl and EAO polymer-based succinic anhydride products resulting from thermal ene and chloro processes typically contain a functionalized (i.e., succinated) hydrocarbon polymer that includes monofunctionalized (i.e., containing one succinic group) and polyfunctionalized (i.e., containing two or more succinic groups) polymer molecules. The thermal ene products are characterized by having a carbon-carbon double bond, and the chloro products are characterized by having a carbon-carbon double bond or a ring other than a succinic ring, and residual chlorine.

Succinic-containing polymers suitable as dispersants per se and as dispersant intermediates have also been prepared by reacting unsaturated dicarboxylic compounds with hydrocarbon polymers in the presence of free radical initiators. U.S. Pat. No. 5,112,507 discloses copolymers having alternating succinic and polyalkyl groups prepared by reacting polyalkenes (especially polyisobutenes) having a high proportion of their unsaturation as alkylvinylidene unsaturation with unsaturated acidic reactants (especially maleic anhydride) in the presence of a free radical initiator. US '507 further discloses polysuccinimides prepared by reacting the alternating copolymer with polyamine. U.S. Pat. No. 5,578,237 discloses grafting EAO polymers of $\overline{M}_n$ of about 700 to about 10,000 and having a high degree of terminal vinylidene unsaturation with mono-unsaturated carboxylic reactants such as maleic anhydride in the presence of a free radical initiator to obtain a product composed of EAO polymers having carboxylic groups such as succinic groups randomly attached along the polymer chains. US '237 further discloses gel-free nitrogen-containing and ester dispersants prepared by reacting the grafted EAO polymers with nucleophilic reactants selected from amines, alcohols, and/or amino alcohols, wherein the reaction is conducted in the presence of a chain-stopper when the nucleophilic reactant has more than one reactive amino or hydroxy group per molecule, in order to ensure a gel-free product.

Multifunctional viscosity index ("VI") improvers are incorporated into lubricating oils to reduce the tendency of the oils to change viscosity with changes in temperature during engine operation, while at the same time performing one or more other desirable functions such as dispersancy. Ethylene copolymers (e.g., ethylene-propylene binary copolymers and ethylene-propylene-diene terpolymers) with $\overline{M}_n$'s of from about 20,000 to about 300,000 have been grafted with carboxylic monomers, typically maleic anhydride, in the presence of a free radical initiator, and the grafted products subsequently reacted with amines to provide products suitable for use as dispersant-VI improvers. Exemplary dispersant-VI improvers based upon ethylene copolymers are described in U.S. Pat. No. 4,160,739, U.S. Pat. No. 4,171,273, and U.S. Pat. No. 4,505,834.

Despite the fact that a wide variety of materials have been disclosed to be useful as dispersants and multifunctional VI improvers, the need still exists for new materials which can provide improved performance in internal combustion engines, particularly in view of the increasingly stringent and demanding performance standards being placed upon engine oils by the American Petroleum Institute and engine manufacturers. Additives with improved dispersancy are needed, as are additives which can provide lubricating oils with a good balance between high- and low-temperature viscometric performance. The achievement of a proper balance between low and high temperature viscometric engine performance is an ongoing problem. Relatively high oil viscosities are needed at high engine operating temperatures to keep the engine surfaces properly lubricated. On the other hand, relatively low viscosities are required at low operating temperatures for efficient oil flow in the engine. At low operating temperatures such as those encountered during engine start-up, the oil can contain wax crystals, whose presence can make it difficult to crank the engine without wear damage to engine surfaces and can also impede proper circulation of the oil-wax slurry in the engine.

SUMMARY OF THE INVENTION

The present invention is directed to a copolymer of an unsaturated dicarboxylic monomer and an unsaturated ethylene α-olefin polymer, the copolymers containing succinic groups and polymeric hydrocarbyl groups. The unsaturated EAO polymer is characterized by having solubility in lubricating oils and a high degree of terminal vinylidene unsaturation.

More particularly, the present invention is a copolymer comprising units of an unsaturated dicarboxylic monomer and an unsaturated ethylene α-olefin polymer which comprises units of ethylene and at least one α-olefin represented by the formula $CH_2=CHR^a$, wherein $R^a$ is a $C_1$ to $C_{18}$ linear alkyl group or a $C_3$ to $C_{18}$ branched alkyl group; wherein the ethylene α-olefin polymer has a number average molecular weight of from about 500 to about 100,000, and at least about 30% of the unsaturation in the ethylene α-olefin polymer is terminal vinylidene. These copolymers and derivatives thereof can provide a good balance of high- and low-temperature viscometric properties in lubricating oils and provide other performance benefits as well, including dispersancy.

A further aspect of the present invention is a copolymer comprising units of an unsaturated dicarboxylic monomer and units of two or more EAO polymers of the type described in the preceding paragraph, wherein the EAO polymers differ in the identity of one or more of the α-olefin co-monomers from which they are derived, their molar ethylene contents, and/or their number average molecular weights. Copolymers derived from two or more EAO polymers can have property and performance characteristics that lie between those exhibited by the copolymers derived from each of the EAO polymers separately. Copolymer performance and properties (e.g., high- and low-temperature viscometrics) can accordingly be tailored by manipulating the choice and amount of each EAO polymer incorporated into the copolymer.

Another aspect of the present invention is a copolymer comprising units of an unsaturated dicarboxylic monomer, units of one or more EAO polymers of the type described above, and units of one or more $C_4$ to $C_{30}$ linear aliphatic olefins. The inclusion of hydrocarbyl groups derived from linear aliphatic olefin(s) can affect copolymer properties and performance (e.g., can result in a beneficial interaction with the wax precipitating from the oil at low temperature to provide improved oil flow during engine start-up). Copolymer behavior can be tailored by manipulating the choice and amount of aliphatic olefin(s) incorporated into the copolymer.

Suitable unsaturated dicarboxylic monomers are mono-olefinic dicarboxylic acid producing compounds having vicinal carboxyl groups, the carboxyl groups respectively located on each of the carbon atoms forming the mono-olefinic bond (i.e., the carbon-carbon double bond), and one or both carboxyl groups capable of acting as acylating agents. The unsaturated dicarboxylic monomers are maleic- or fumaric-type compounds.

Certain preferred embodiments of the copolymers of the invention are copolymers in which the dicarboxylic monomer is maleic anhydride; copolymers based upon EAO polymers having at least about 50%, preferably at least about 60%, terminal vinylidene unsaturation, optionally in combination with less than about 25%, preferably less than about 15%, and more preferably less than about 10%, terminal vinyl unsaturation; copolymers based upon EAO polymers having a molar ethylene content of from about 15 to about 90 mole %; copolymers based upon EAO polymers having a molar ethylene content of at least about 40 mole %, preferably from about 40 to about 80 mole %, and more preferably from about 40 to about 65 mole %; copolymers based upon EAO polymers having a number average molecular weight of from about 500 to about 20,000; copolymers based upon EAO polymers having a number average molecular weight of from about 20,000 to about 100,000, and copolymers having an average degree of polymerization of at least about 3, and preferably from about 3 to about 20.

Another aspect of the invention is a process for preparing the copolymer of the invention by polymerizing an unsaturated dicarboxylic reactant with an unsaturated polymer reactant in the presence of a free radical initiator. Yet another aspect is a grafted copolymer obtained by grafting the copolymer of the invention with an unsaturated dicarboxylic grafting reactant in the presence of a free radical initiator.

The present invention includes derivatives of the copolymers of the invention, prepared by reacting the copolymers with derivatizing compounds. In particular, the present invention includes derivatized copolymers prepared by the reacting the copolymers with nucleophilic reactants selected from the group consisting of monoamines, polyamines, monoalcohols, polyols, amino alcohols, reactant metal compounds and mixtures thereof.

A further aspect of the invention is the post-treatment of the derivatized copolymers by reaction with one or more post-treating agents selected from boron compounds, phosphorus compounds, carboxylic acid acylating agents (e.g., alkyl, alkenyl, polyalkyl and polyalkenyl carboxylic acids, anhydrides, and esters), and the like.

The copolymers, grafted copolymers, derivatized copolymers (optionally also grafted), and post-treated derivatized copolymers (optionally also grafted) of the invention are useful as additives in fuels and in lubricating oils. In particular, the copolymers, grafted copolymers, and derivatives thereof obtained from EAO polymers having number average molecular weights of from about 500 to about 20,000 have utility as detergent and dispersant additives in fuels and lubricating oils, and those obtained from EAO polymers having number average molecular weights of from about 20,000 to about 100,000 have utility as dispersant-VI improver additives in lubricating oils.

The copolymers of the present invention are prepared by polymerization of an unsaturated dicarboxylic monomer and at least one unsaturated EAO polymer (and optionally one or more linear aliphatic olefins) in the presence of a free radical initiator, wherein the carbon-carbon double bonds participating in the polymerization become saturated and a copolymer having a carbon-carbon backbone and containing succinic groups and polymeric hydrocarbyl groups is formed. The copolymers of the invention are distinguished from thermal ene and chloro products that can be formed from the same reactants by the saturation of the double bonds participating in copolymerization reaction; i.e., a carbon-carbon double bond in the EAO polymer becomes saturated as a result of forming the copolymers of the invention, whereas a carbon-carbon double bond is not saturated in the EAO polymer in forming a thermal ene product, but is instead shifted to a different position. Similarly, in forming the chloro products, a carbon-carbon double bond in the EAO polymer will shift position and/or participate in ring formation, so that the chloro products will contain unsaturation and/or rings not present in the copolymers of the invention.

The residual unsaturation present in the thermal ene and chloro products can be problematic, because it is a potential site for oxidation and degradation of the products in high temperature environments, such as the environment these products encounter when employed as dispersants in passenger car motor oils. The residual unsaturation can be saturated by hydrogenation, but this of course requires an additional processing step at additional cost. The absence of this residual unsaturation in the copolymers of the invention avoids this problem.

The chloro products will also contain chlorine, which can adversely affect the stability of the product and which is also undesirable from an environmental standpoint. By contrast, for cases where a non-chlorine-containing dicarboxylic monomer is employed, the copolymer of the present invention is essentially free of chlorine; i.e., at most trace levels of chlorine will be present in the copolymer due to residual chlorine (typically<10 ppm) in the starting EAO polymer introduced during its preparation, such as via use of a chlorine-containing polymerization catalyst.

The copolymers of the invention differ from copolymers having succinic groups and polyalkyl groups (e.g., polyisobutyl groups), such as disclosed in U.S. Pat. No. 5,112,507, in that the copolymers of the present invention contain polymeric hydrocarbyl groups derived from unsaturated EAO polymers instead of polyalkyl groups derived from polyalkenes. The copolymers of the invention offer advantages over similar copolymers based on polyalkenes, because the branching in the polymeric hydrocarbyl groups in the copolymers of the invention can be manipulated by controlling the ethylene content of the starting EAO polymer. Increasing the ethylene content of the starting EAO polymer will decrease branching and increase crystallinity, which in turn can increase viscosity of the inventive copolymer. More particularly, the manipulation of the ethylene content of the starting EAO polymer, optionally in combination with manipulation of its molecular weight, permits adjustment of the high temperature viscometric performance of the copolymer of the invention in a controlled fashion. For example, a copolymer of the invention (and derivatives thereof) can be designed to impart to the engine oil in which it is employed a higher, less temperature dependent viscosity at the oil's operating temperature. Copolymers based on polyalkenes cannot be manipulated in this manner, because the number of branches in the polyalkyl groups cannot be so adjusted.

The copolymers of the invention also differ from EAO polymers which have been grafted with an unsaturated dicarboxylic grafting monomer in the presence of a free radical initiator. The copolymers of the invention have succinic groups incorporated directly into the carbon-carbon backbone, whereas the grafted EAO polymers contain succinic groups randomly attached along the backbone of the EAO polymer. Furthermore, unlike the copolymers of the invention, grafted EAO polymer can contain crosslinked product and can form gels.

These and other features and aspects of the invention will be readily apparent from the ensuing description.

DETAILED DESCRIPTION OF THE INVENTION

Ethylene α-Olefin Polymer

Figure 1:
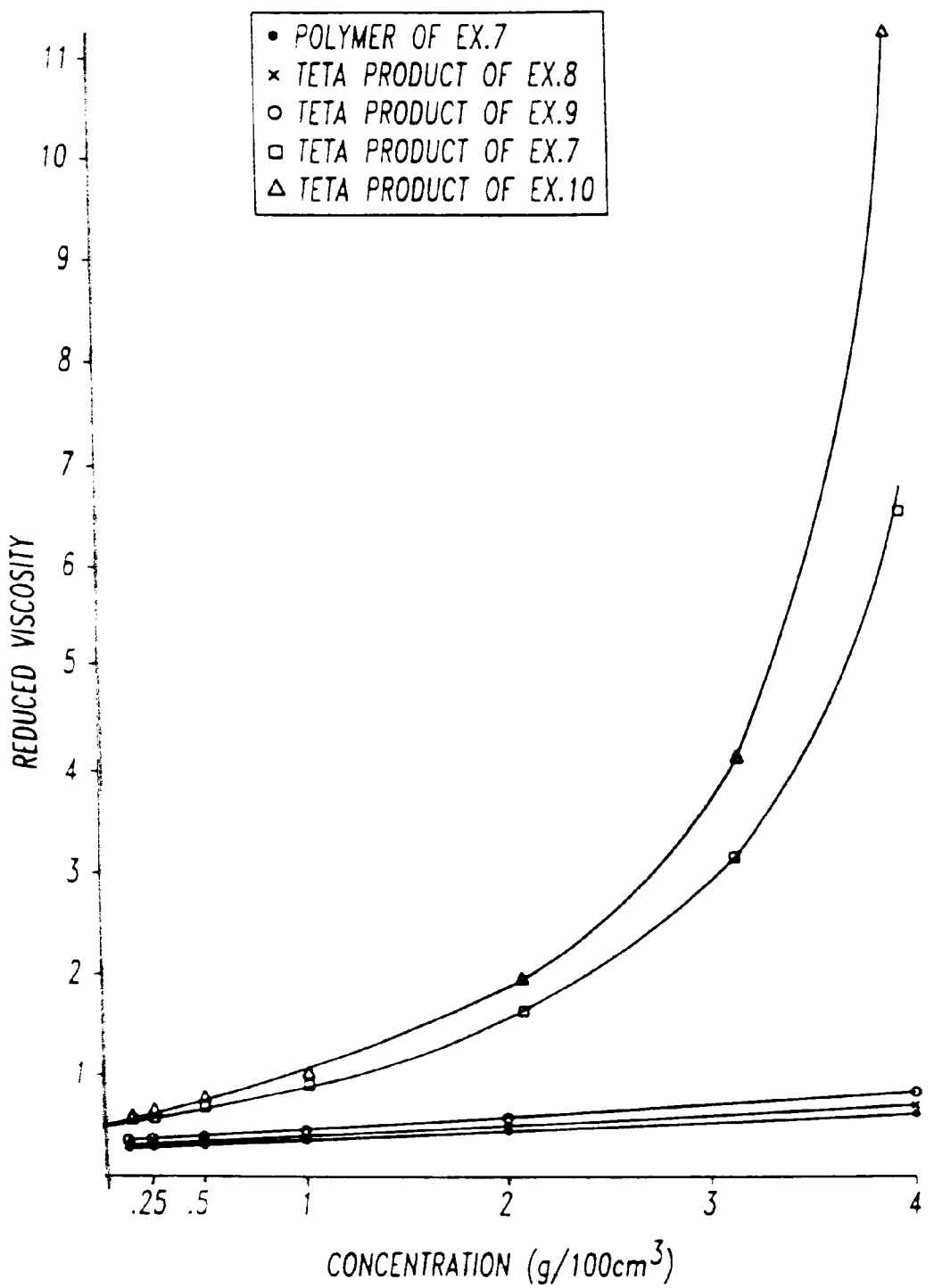
FIG. 1 is a plot of reduced viscosity versus concentration for the polymer solutions described in Example 11.

The polymers which are useful for preparing the copolymers of the invention are unsaturated ethylene α-olefin polymers comprising ethylene and at least one α-olefin represented by the formula:

$$CH_2=CHR^a \quad (I)$$

wherein $R^a$ is a $C_1$ to $C_{18}$ linear alkyl group or a $C_3$ to $C_{18}$ branched alkyl group. In one preferred embodiment, $R^a$ in the above formula is a linear alkyl group of from 1 to 8 carbon atoms or a branched alkyl group of from 3 to 8 carbon atoms. In another preferred embodiment, $R^a$ is linear or branched alkyl group of from 2 to 6 carbon atoms. In yet another preferred embodiment, $R^a$ is an alkyl group of from 1 to 2 carbon atoms. Most preferably $R^a$ is ethyl. Therefore, α-olefin monomers suitable for polymerization with ethylene include propylene, butene-1, pentene-1,3-methylbutene-1, hexene-1,4-methylpentene-1, heptene-1, octene-1, nonene-1, decene-1, dodecene-1, tridecene-1, tetradecene-1, pentadecene-1, hexadecene-1, heptadecene-1, octadecene-1, nonadecene-1, eicosene-1 and mixtures thereof (e.g., mixtures of propylene and pentene-1, propylene and pentene-1 and hexene-1, and so forth). Preferred α-olefin monomers for use with ethylene include propylene, butene-1, pentene-1,3-methylbutene-1, hexene-1,4-methylpentene-1, heptene-1, octene-1 and mixtures thereof. In a preferred embodiment, the α-olefin monomers are propylene, butene-1 and a mixture of propylene and butene-1. Butene-1 is most preferred. Accordingly, a preferred embodiment of EAO polymers consists of ethylene-propylene polymer, ethylene-butene-1 polymer, and ethylene-propylene-butene-1 polymer. Ethylene-butene-1 polymer is most preferred.

The molar ethylene content of the EAO polymers (i.e., the mole percent of units in the copolymer derived from ethylene) is suitably at least about 5 mole % (e.g., from about 5 to about 95 mole %) and typically in the range of from about 15 to about 90 mole % (e.g., from about 30 to about 90 mole %), and more typically from about from about 20 to about 80 mole %. In one embodiment, the molar ethylene content is at least about 40 mole % (e.g., from about 40 to about 90 mole %), preferably from about 40 to 80 mole % (e.g., from about 45 to 75 mole %), and more preferably from about 40 to about 65 mole % (e.g., from about 45 to about 65 mole %). In another embodiment, the molar ethylene content is at least about 5 mole % (e.g., from about 5 to about 95 mole %) with the proviso that, when the α-olefin monomer is propylene, the molar ethylene content is at least about 40 mole % (e.g., from about 40 to about 95 mole %). The molar ethylene content of the polymers can be determined by $^1$H-NMR or $^{13}$C-NMR.

EAO polymers suitable for use in preparing the copolymers of the invention include polymers comprising ethylene, at least one α-olefin represented by formula (I), and at least one non-conjugated diene such as dicyclopentadiene, 1,4-hexadiene, and ethylidene norbornene, and other such dienes known in the art. The non-conjugated diene content of the polymer (i.e., the mole percent of units derived from non-conjugated dienes in the polymer) is generally less than about 15 mole % (e.g., from about 0.1 to about 15 mole %), typically less than about 10 mole % (e.g., from about 0.1 to about 10 mole %), and is especially from about 0.1 to about 5 mole %. Thus, suitable EAO polymers include ethylene (α-olefin diene polymers comprising from about 15 to about 90 mole % of units derived from ethylene, from about 10 to about 85 mole % of units derived from an α-olefin of formula (I), and from about 0.1 to about 15 mole % of units derived from a non-conjugated diene. Diene content of the polymers can be determined by $^1$H-NMR or $^{13}$C-NMR.

The EAO polymer has a number average molecular weight of from about 500 to about 100,000 and more typically from about 700 to about 100,000 (e.g., from about 900 to about 100,000). EAO polymers having a $\overline{M}_n$ of from about 500 to about 20,000 (e.g., from about 700 to about 20,000 or from about 1,000 to about 20,000), typically from about 700 to about 15,000 (e.g., from about 1,000 to about 15,000), and more typically from about 1,000 to about 10,000 (e.g., from about 1,500 to about 10,000 or from about 2,000 to about 8,000), are referred to herein as low molecular weight polymers or macromers. The low molecular weight polymers are especially useful for preparing copolymers of the invention (and derivatives thereof) which are effective as dispersant additives in lubricating oils, and, accordingly, are also referred to herein as dispersant range molecular weight polymers. EAO polymers having a $\overline{M}_n$ in the range of from about 900 to about 7,000 (e.g., from about 1,000 to about 6,000) are especially suitable macromers for preparing copolymers of the invention (and derivatives thereof) that are useful as lubricating oil dispersant additives. In addition, low molecular weight EAO polymers, particularly polymers having number average molecular weights of from about 500 to about 4,000 (e.g., about 500 to about 2,500), are useful in forming copolymers of the invention (and derivatives thereof) that have utility as detergent and/or dispersant additives in fuels. $\overline{M}_n$'s of the low molecular weight EAO polymers can be determined by vapor phase osmometry ("VPO"; see, e.g., ASTM No. D3592) or by gel permeation chromatography ("GPC").

EAO polymers having $\overline{M}_n$'s ranging from about 20,000 to about 100,000 (e.g., from about 20,000 to about 80,000) and more typically from about 20,000 to about 50,000, are referred to herein as medium molecular weight polymers. The medium molecular weight polymers are useful, for example, in forming copolymers of the invention (and derivatives thereof) that have utility as multifunctional dispersant-viscosity index ("VI") improvers in lubricating oil compositions, and, accordingly, are also referred to herein as VI improver range molecular weight polymers. $\overline{M}_n$'s of the medium molecular weight EAO polymers can be determined by membrane osmometry.

The value of the ratio $\overline{M}_w/\overline{M}_n$, referred to as molecular weight distribution ("MWD"), for the EAO polymers is not critical. However, a minimum $\overline{M}_w/\overline{M}_n$ value of from about 1.1 to about 2.0 is especially suitable, and a typical range is from about 1.1 to about 5 (e.g., from about 1.1 to about 3).

The EAO polymer is unsaturated and has a high degree of terminal unsaturation. Terminal unsaturation is the unsaturation provided by the last monomer unit located in the polymer. The unsaturation can be located anywhere in this terminal monomer unit. At least about 30% (e.g., from about 30 to about 100%), typically at least about 50% (e.g., from about 50 to about 99%), preferably at least about 60% (e.g., from about 60 to about 99%), and more preferably at least about 75% (e.g., from about 75 to about 98%) of the unsaturation in the EAO polymer is terminal vinylidene (also referred to in the art as terminal ethenylidene unsaturation). Thus, one end of such polymers will be of the formula POLY-C($R^a$)=$CH_2$ wherein $R^a$ is as defined above and POLY represents the polymer chain. A minor amount of the polymer can contain terminal vinyl unsaturation (also referred to as terminal ethenyl unsaturation), POLY-CH=$CH_2$; a portion of the polymer can contain vinylene unsaturation (also referred to as 1,2-disubstituted terminal unsaturation), POLY-CH=CH($R^a$); and a portion of the polymer can contain trisubstituted or tetrasubstituted unsaturation. The EAO suitably has less than about 40%, typically less than about 25%, preferably less than about 15% (e.g., from about 0 to about 10%), more preferably less than about 10% (e.g., from about 0 to 5%) terminal vinyl unsaturation. The types and percentages of unsaturation in the polymer can be determined via FTIR spectroscopic analysis, $^1$H-NMR, or $^{13}$C-NMR.

The EAO polymers are characterized by having aliphatic hydrocarbyl branches along the backbone, wherein the branches are typically linear or branched $C_1$ to $C_{18}$ alkyl groups and mixtures thereof More particularly, the EAO polymers have an average of at least about 1 to less than about 50 branches per 100 backbone carbon atoms. The polymers typically have an average of from about 5 to less than about 50, and more typically from about 5 to about 40 (e.g., from about 10 to about 40) branches per 100 backbone carbon atoms. In one preferred embodiment, the polymers have from about 15 to about 35 branches per 100 backbone carbon atoms. In another preferred embodiment, the polymers have no more than about 30 branches (e.g., from about 5 to about 30 branches) per 100 backbone carbon atoms.

The type and amount of branching in the EAO polymers is controlled to a large extent by the choice of α-olefin monomer(s) and the degree of incorporation of the chosen monomer(s) into the polymer. As described more fully below, the EAO polymers are prepared by polymerization of ethylene and the selected co-monomer(s) in the presence of a transition metal coordination catalyst which will generally result in a "normal" polymerization, i.e., the usual unit in the polymer derived from ethylene will be —$CH_2CH_2$— and the usual unit derived from an α-olefin of formula (I) will be —$CH_2CHR^a$—wherein $R^a$ is a branch on the carbon-carbon backbone. Other units with different branching may be present due, for example, to "defective" monomer insertion during the polymerization, but such units are generally present only in negligible amounts. Accordingly, an ethylene-propylene polymer containing 50 mole % units derived from ethylene will have an average of about 25 branches per 100 backbone carbon atoms (which is equivalent in this case to an average of about 10 branches per 100 total carbon atoms in the polymer), wherein substantially all of the branches are methyl groups. In any event, the average branching in the EAO polymer can be determined by $^1$H-NMR or $^{13}$C-NMR.

The EAO polymer is substantially to entirely composed of carbon and hydrogen atoms. Nonetheless, the EAO polymer can contain non-hydrocarbon substituents, such as lower alkoxy (lower=1 to 7 carbon atoms), lower alkyl mercapto, hydroxy, mercapto, and carbonyl, to the extent that the non-hydrocarbon moieties do not substantially affect the hydrocarbon nature of the polymer and do not substantially interfere (i) with the use of the EAO polymer as a macromer for preparing the copolymers of the invention or (ii) with the properties and chemical behavior of the inventive copolymer obtained therefrom. Such substituents contribute suitably not more than about 10 wt. %, typically not more than about 5 wt. %, and preferably not more than about 1 wt. %, of the total weight of the EAO polymer.

The EAO polymers can be prepared by polymerizing monomer mixtures comprising ethylene and the corresponding α-olefin monomers (optionally also containing non-conjugated diene(s)) in the presence of a metallocene catalyst system comprising at least one metallocene (e.g., a cyclopentadienyl-transition metal compound) and an activator (e.g., alumoxane compound). The ethylene content can be controlled through selection of the metallocene catalyst component and by controlling the relative amounts of the monomers. Illustrative of the processes which may be employed to make the polymers are those described in U.S. Pat. No. 4,668,834, U.S. Pat. No. 4,704,491, U.S. Pat. No.

5,229,022, and U.S. Ser. No. 652185, filed May 23, 1996; which is a continuation of U.S. Ser. No. 260862, filed Jun. 16, 1994; which is a continuation of U.S. Ser. No. 992690, filed Dec. 17, 1992, abandoned.

Unsaturated Dicarboxylic Monomer

The unsaturated dicarboxylic monomers used in preparing copolymers of the present invention are mono-olefinic dicarboxylic acid producing compounds having vicinal carboxyl groups, the carboxyl groups respectively located on each of the carbon atoms forming the mono-olefinic bond (i.e., the carbon-carbon double bond), and one or both carboxyl groups capable of acting as acylating agents. The unsaturated dicarboxylic monomers are maleic- or fumaric-type compounds. A suitable unsaturated dicarboxylic monomer is represented by the formula:

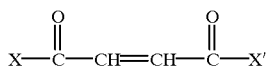

(II)

wherein X and X' are the same or different, and at least one of X and X' is a group that is capable of reacting to esterify alcohols, form amides or amine salts with ammonia or amines, form metal salts with reactive metals or with basically reacting metal compounds, or can otherwise function as an acylating agent. Typically, X and/or X' is hydroxy (—OH), hydrocarbyloxy (—O-hydrocarbyl), metalloxy cation (—OM$^+$ where M$^+$ represents one equivalent of a metal), ammonium or amine cation, amino (—NH$_2$), chloro (—Cl), bromo (—Br), or is anhydride, when X and X' are taken together to form cyclic —O—. Especially suitable are monomers of formula (II) in which both X and X' are selected such that both carboxylic functional groups are capable of entering into acylation reactions. Preferably, X and X' are each independently selected from the group consisting of —OR$^b$ and halogen, wherein R$^b$ is H or C$_1$ to C$_{20}$ alkyl, or X and X' are taken together to form cyclic —O—. More preferably, X and X' are each independently —OR$^b$, wherein R$^b$ is H or C$_1$ to C$_5$ alkyl, or X and X' are taken together to form cyclic —O—.

Suitable unsaturated dicarboxylic monomers include maleic anhydride; monophenylmaleic anhydride; monomethyl, dimethyl, monochloro, monobromo, monofluoro, dichloro and difluoro maleic anhydride; N-phenylmaleimide and other substituted maleimides; isomaleimides; fumaric acid, maleic acid, and alkyl hydrogen maleates and fumarates; dialkyl maleates and fumarates; fumaronilic acids and maleanic acids; and maleonitrile and fumaronitrile. Mixtures of one or more unsaturated dicarboxylic monomers can also be employed.

Especially suitable dicarboxylic monomers are maleic anhydride and maleic acid. The preferred monomer is maleic anhydride.

Preparation of the Copolymer

The copolymers of the present invention are prepared by reacting the unsaturated EAO polymer and the unsaturated dicarboxylic monomer in the presence of a free radical initiator. The reaction is typically conducted at a temperature in the range of from about 20 to about 140° C., preferably in the range of from about 40 to about 100° C. Reaction temperatures above about 140° C. are not employed, because random grafting of the dicarboxylic monomer to the EAO polymer can occur at these temperatures, resulting in a succinic substituted EAO polymer product, rather than the desired copolymer of the invention. Temperatures below about 20° C. are generally not employed, because the polymerization reaction typically either does not proceed at these temperatures, or proceeds too slowly to be practical. The average degree of polymerization of the copolymer can be controlled to some extent by manipulation of the reaction temperature; i.e., when all other reaction parameters are held constant, lowering the reaction temperature tends to produce copolymer having a higher degree of polymerization, and vice versa.

The reaction is a solution-type polymerization reaction and is typically conducted in a solvent. Suitable solvents are those in which the reactants and free radical initiator are soluble, such that these components are brought into intimate contact during the reaction. After the reaction is complete, volatile components can be stripped off. The solvent normally must also be capable of dissolving the copolymer product. The solvent is preferably inert to the reactants and products formed and is generally used in an amount sufficient to ensure efficient heat and mass transfer during the reaction, to ensure solubility of the copolymer product, and to facilitate treating and/or handling of the post-reaction mixture. The solvent is typically employed in a volume ratio of solvent to EAO polymer of from about 1:1 to about 100:1, preferably from about 1.5:1 to about 4:1.

Suitable solvents include liquid C$_6$ to C$_{20}$ saturated or aromatic hydrocarbons, C$_3$ to C$_5$ ketones, liquid saturated C$_1$ to C$_5$, preferably C$_1$ to C$_3$, aliphatic dihalogenated hydrocarbons, and liquid cyclic ethers. "Liquid" means liquid under the polymerization conditions employed. In the dihalogenated hydrocarbons, the halogens (i.e., F, Cl, and Br) are preferably on adjacent carbon atoms. Examples of suitable solvents include (1) ketones such as acetone, methylethylketone, diethylketone, and methylisobutylketone; (2) aromatic hydrocarbons such as benzene, xylene, and toluene; (3) saturated dihalogenated hydrocarbons such as dichloromethane, dibromomethane, 1-bromo-2-chloroethane, 1,1-dibromoethane, 1,1-dichloroethane, 1,2-dichloroethane, 1,3-dibromopropane, 1,2-dibromopropane, 1,2-dibromo-2-methylpropane, 1,2-dichloropropane, 1,1-dichloropropane, 1,3-dichloropropane, 1-bromo-2-chloropropane, 1,2-dichlorobutane, 1,5-dibromopentane, and 1,5-dichloropentane; (4) ethers such as dioxane or tetrahydrofuran; and (5) mixtures of the foregoing, such as benzene and methylethylketone.

Mineral lubricating oils can also be employed as solvents. Post-reaction separation of such oils from the copolymer product can be difficult to achieve, but, at least for cases where the copolymer product, or a derivative thereof, is to be used as a lubricating oil additive in the same or in a compatible oil, such separation may be unnecessary.

If desired, dispersing agents and/or cosolvents can be used during the reaction.

The reaction can alternatively be conducted neat, when reacting EAO polymers with $\overline{M}_n$'s below about 10,000, and especially below about 5,000; i.e., the EAO polymer, the dicarboxylic monomer, and the free radical initiator can be mixed together and reacted in the absence of a solvent. In such cases, the EAO polymer will act as the diluent. The use of a neat reaction system can have the advantage of avoiding a post-reaction solvent stripping step. However, EAO polymers with $\overline{M}_n$'s above about 10,000 are normally too viscous in the absence of a solvent to permit efficient mixing of the reactants and efficient heat and mass transfer during the reaction.

The copolymerization can be initiated by any free radical initiator that will decompose thermally under the reaction conditions employed. The preferred free-radical initiators are the peroxide-type polymerization initiators and the azo-type polymerization initiators, which are well known in the art. Radiation can also be used to initiate the reaction, if desired.

The peroxide-type free-radical initiator can be organic or inorganic. Suitable organic peroxide initiators can be represented by the formula:

$$R^c OOR^{c'} \quad (III)$$

wherein $R^c$ is any organic radical and $R^{c'}$ is selected from the group consisting of hydrogen and any organic radical, Both $R^c$ and $R^{c'}$ can be organic radicals, preferably hydrocarbyl, aroyl, and acyl radicals, carrying, if desired, substituents such as halogens, etc. Especially suitable peroxides include benzoyl peroxide, di-tert-butyl peroxide, tert-butyl peroxybenzoate, and dicumyl peroxide. Other suitable peroxides include lauroyl peroxide; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds can be defined as those having an —N=N— group present in the molecule wherein the open bonds are satisfied by organic radicals, at least one of which is preferably attached to a tertiary carbon. A suitable azo-type initiator is α, α'-azobisisobutyronitrile. Other suitable azo compounds include p-bromobenzenediazonium fluoborate; p-tolyldiazoaminobenzene; p-bromobenzenediazonium hydroxide; azomethane and phenyidiazonium halides.

Tables listing peroxide-type compounds and azo-type compounds which are suitable for use herein as free radical initiators are set forth in "Initiators", C. S. Sheppard and V. Kamath, pages 355–373 in *Kirk-Othmer Encyclopedia of Chemical Technology*, 3d edition, volume 13 (Wiley-Interscience, New York, 1981). A list of suitable azo-type compounds is also disclosed in U.S. Pat. No. 2,551,813.

The amount of initiator employed depends to a large extent on the activity of the chosen initiator under the reaction conditions employed. The initiator must be soluble in the reaction medium and must decompose at the selected polymerization temperature. The concentration of initiator is typically from about 0.001 to about 10 wt. %, and preferably from about 0.005 to about 5 wt. % of initiator, based on the weight of dicarboxylic monomer.

The EAO polymer and dicarboxylic monomer can be used in any amounts which result in the formation of at least some copolymer in the presence of the chosen free radical initiator and the selected reaction conditions. Typically, however, the dicarboxylic monomer is employed in an amount of from about 0.1 to about 20 moles, and preferably from about 0.2 to 10 moles (e.g., from about 0.2 to about 5 moles), per mole of EAO polymer. The use of substantial excesses of either reactant may not be desirable. A substantial excess of dicarboxylic monomer reactant can be undesirable, because it can result in a copolymer product containing homopolymerized dicarboxylic monomer by-products and/or unreacted dicarboxylic monomer, both of which can interfere with subsequent derivatizations of the copolymer (described below) and accordingly must be removed (e.g., by distillation or by inert gas stripping with or without a partial vacuum). The use of a large excess of dicarboxylic monomer can also result in the formation of randomly grafted copolymer by-product, particularly at reaction temperatures approaching 140° C. A substantial excess of EAO polymer can result in a product containing unconverted EAO polymer which represents "wasted" polymer. Such polymer is typically not removed from the reaction mixture, because such removal is difficult or impractical.

The reaction is typically conducted under an inert atmosphere (e.g., under nitrogen) and typically at atmospheric or elevated pressure. Atmospheric pressure is preferred, but elevated pressure is sometimes required to maintain the solvent in the liquid phase.

The reaction time will vary depending upon the reaction temperature employed, the choice and amount of free radical initiator, the concentration of the reactants, the degree of conversion desired, and so forth. A reaction time in the range of from about 0.5 to about 24 hours is generally sufficient for these purposes. More typical reaction times are from about 2 to about 18 hours (e.g., from about 2 to about 12 hours).

The EAO polymer, dicarboxylic monomer, solvent (if employed), and initiator can be brought together in the reaction zone in any suitable manner. The important factors are intimate contact of the EAO polymer and dicarboxylic monomer in the presence of a free-radical producing material. The reaction can be carried out batchwise, semi-continuously, or continuously. For example, the reaction can be conducted in a batch system where the entire charge of EAO polymer is added to a mixture of dicarboxylic monomer, initiator and solvent at or before the start of the reaction; or the charge of polymer can be added intermittently or continuously to the reaction zone over the course of the reaction. The reactants may be combined in other sequences; e.g., the polymer and solvent can be charged to the reaction zone first to form a polymer solution, followed by charging of the dicarboxylic monomer and initiator to the polymer solution. In a continuous process, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The copolymer can be separated from solvent and unreacted dicarboxylic monomer by conventional procedures such as phase separation, solvent distillation, precipitation, stripping with an inert gas (e.g., nitrogen) with or without a partial vacuum, and the like.

As further described below, an aspect of the present invention is a copolymer of an unsaturated dicarboxylic monomer and two or more different unsaturated EAO polymers (i.e., two or more EAO macromers). The reaction conditions and the choice and amounts of reaction components described above also apply to the use of two or more EAO polymers, wherein the total amount of all the EAO polymers employed is substituted for the amount of one polymer set forth above. With regard to the charging of the reaction components to the reaction zone, the EAO polymers can be first mixed together and the mixture charged in the same manner as described above for a single EAO polymer. Alternatively, the polymers can be separately charged, either concurrently or sequentially in any order. For example, in a batch process involving two EAO polymers, the entire charge of the first EAO polymer can be added to a mixture of the dicarboxylic monomer, initiator and solvent, followed either by (i) addition of the entire charge of the second EAO polymer at or before the start of the reaction or (ii) by the intermittent or continuous addition of the second EAO polymer to the reaction zone over the course of the reaction. Other charging sequences involving two or more EAO polymers are readily apparent to the person of ordinary skill in the art, in view of the foregoing description.

The proportions of the EAO polymers employed in the polymerization can vary over a wide range. Each polymer is suitably employed in an amount of at least about 1 wt. % (e.g., from about 1 to about 99 wt. %) and typically in an amount of at least about 5 wt. % (e.g., from about 5 to about 95 wt. %), based on the total weight of EAO polymers charged to the reaction. For a pair of EAO polymers, one EAO polymer is suitably employed in an amount ranging from about 1 to about 99 wt. % (e.g., from about 20 to about 80 wt. %), typically from about 5 to about 95 wt. % (e.g., from about 30 to about 70 wt. %), and preferably from about 10 to about 90 wt. % (e.g., from about 40 to about 60 wt. %) based on the total weight of the two polymers charged to the reaction, with the second EAO polymer representing the balance.

Another aspect of the present invention, further described below, is a copolymer of an unsaturated dicarboxylic monomer, one or more unsaturated EAO polymers, and one or more $C_4$ to $C_{30}$ linear aliphatic olefins. The reaction conditions and the choice and amounts of reaction components set forth above for the use of EAO polymers also apply to the use of EAO polymer(s) in combination with linear aliphatic olefin(s). With regard to the charging of the reaction components to the reaction zone, the description in the next to preceding paragraph concerning the charging of two or more EAO polymers applies here, wherein an aliphatic olefin replaces at least one, but not all, of the EAO polymer components.

The proportions of the EAO polymer and aliphatic olefin employed in the polymerization can vary over a wide range. The EAO polymer(s) suitably represents at least about 25 wt. % (e.g., from about 25 to about 99.9 wt. %) of the total weight of the polymer and aliphatic olefin charged to the reaction. Typically, the EAO polymer(s) represent at least about 50 wt. % (e.g., from about 50 to about 99.9 wt. %) of the total weight of polymer and aliphatic olefin charged to the reaction. When a single EAO polymer and a single aliphatic olefin are employed, the EAO polymer typically represents from about 50 to about 99.9 wt. % (e.g., from about 60 to about 99 wt. %) and preferably from about 70 to about 99.9 wt. % (e.g., from about 75 to about 99 wt. %) of the total weight of polymer and aliphatic olefin charged to the reaction.

The Copolymer

The copolymer product of the invention, resulting from the polymerization of an unsaturated dicarboxylic monomer and an unsaturated EAO in the presence of a free radical initiator as just described, is a copolymer of succinic groups derived from the unsaturated dicarboxylic monomer and polymeric hydrocarbyl groups derived from the unsaturated ethylene α-olefin polymer.

The copolymer of the present invention suitably has an average degree of polymerization of at least about 2, typically at least about 3, preferably from about 3 to about 60, and more preferably from about 3 to about 40 (e.g., from about 3 to about 20). Average degree of polymerization $D_p$ is the average number of monomer units incorporated into the copolymer and can be represented as:

$$D_p = \Sigma_i [\overline{M}_{n,COP} \times \text{wt. }\%_i]/[100 \times mw_i] \qquad (IV)$$

wherein $\overline{M}_{n,COP}$ is the $\overline{M}_n$ of the copolymer of the invention; wt. $\%_i$ is the weight percent of units derived from monomer i in the polymer and $mw_i$ is the molecular weight of monomer i. $\overline{M}_{n,COP}$ can be determined by conventional methods such as VPO, GPC and $^{13}$C-NMR.

The copolymers of the present invention can be represented as a copolymer comprising:

(A) one or more succinic groups A wherein A is represented by the formula:

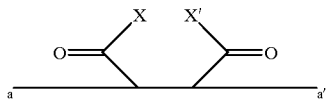

(VI)

wherein X and X' are as defined earlier, and preferably are each independently selected from the group consisting of —$OR^b$ and halogen, wherein $R^b$ is H or $C_1$ to $C_{20}$ alkyl, or X and X' are taken together to form cyclic —O—; and (B) one or more hydrocarbyl groups B wherein B is represented by the formula:

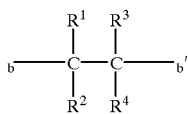

(VII)

wherein $R^1$, $R^2$, $R^3$ and $R^4$ are selected from hydrogen, $C_1$ to $C_{18}$ linear alkyl or $C_3$ to $C_{18}$ branched alkyl, and long chain hydrocarbyl, with the proviso that at least one of $R^1$, $R^2$, $R^3$ and $R^4$ is long chain hydrocarbyl; wherein the long chain hydrocarbyl has an average of from at least about one to less than about 50 branches per 100 backbone carbon atoms; and wherein the —$C(R^1R^2)$—$C(R^3R^4)$— moiety has an average of at least about 35 carbon atoms; and wherein a, a', b, and b' are covalent bonding sites, with sites a and a' in each succinic group A being capable of forming covalent bonds with other a and a' sites and with b and b' sites, and with sites b and b' in each hydrocarbyl group B being capable of forming covalent bonds with other b and b' sites and with a and a' sites; and wherein at least one succinic group A is covalently bonded to at least one hydrocarbyl group B; and wherein the copolymer has an average degree of polymerization of at least about 2.

The copolymer of the invention can range in structure from a random copolymer to an alternating copolymer (i.e., substantially all of the succinic groups alternate with the hydrocarbyl groups in the copolymer chain). In a preferred embodiment, the copolymer is an alternating copolymer whose succinic groups are derived from maleic anhydride. The structure of the copolymer will depend upon, for example, the choice and relative amounts of monomers employed, method of charging the monomers to the reaction zone, the choice and amount of free radical initiator, and polymerization conditions (time, temperature, and so forth).

In a preferred embodiment, X and X' together form cyclic —O—, giving thereby a copolymer containing succinic anhydride groups. Such groups can be obtained, for example, when maleic anhydride is used as the unsaturated dicarboxylic monomer, or when maleic acid is used as the dicarboxylic monomer, followed by dehydration. Accordingly, a preferred succinic group of formula (VI) above is the succinic anhydride unit represented by the formula:

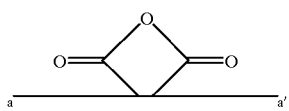

(VIII)

The —$C(R^1R^2)$—$C(R^3R^4)$— moiety of formula (VII) is derived from the EAO polymer. The moiety typically has an average of from about 35 to about 7000 carbon atoms. In one embodiment, the moiety has an average of from about 35 to about 1400 carbon atoms (e.g., from about 70 to about 400 carbon atoms) which provides copolymers and derivatives thereof that are effective as dispersant additives in lubricating oils. In another embodiment, the moiety has an average of from about 1500 to about 7000 carbon atoms (e.g., from about 1500 to about 3500 carbon atoms), which provides copolymers and derivatives thereof that are effective as multifunctional dispersant-VI improvers in lubricating oils.

The long chain hydrocarbyl group typically contains an average of at least about 30 carbon atoms. Generally speaking, the long chain hydrocarbyl group will reflect the structure (e.g., branching) and composition of the EAO polymer from which the —C(R$^1$R$^2$)—C(R$^3$R$^4$)— moiety is derived. Accordingly, the backbone of the long chain hydrocarbyl will consist substantially of dimethylene units (—CH$_2$CH$_2$—) derived from ethylene and alkylethylene units of formula —CH$_2$CHR$^a$— derived from at least one α-olefin of formula (I), wherein R$^a$ is a branch on the long chain hydrocarbyl group's backbone. The long chain hydrocarbyl has an average of at least about one to less than about 50 branches per 100 carbon atoms in its backbone. The long chain hydrocarbyl typically has an average of from about 5 to less than about 50, and more typically from about 5 to about 40 (e.g., from about 10 to about 40), branches per 100 backbone carbon atoms. In one preferred embodiment, the long chain hydrocarbyl has from about 15 to about 35 branches per 100 backbone carbon atoms, and, in another preferred embodiment, the long chain hydrocarbyl has no more than about 30 branches (e.g., from about 5 to about 30 branches) per 100 backbone carbon atoms.

Generally, such copolymers contain an initiator group, I, and a terminator group, T, as a result of the reaction with the free radical initiator used in the polymerization reaction. In such a case, the initiator and terminator groups may be:

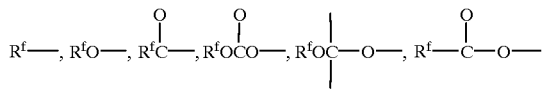

wherein R$^f$ is hydrogen, alkyl, aryl, alkaryl, cycloalkyl, alkoxy, cycloalkoxy, acyl, alkenyl, cycloalkenyl, alkynyl; or alkyl, aryl or alkaryl optionally substituted with 1 to 4 substituents independently selected from nitrile, keto, halogen, nitro, alkyl, aryl, and the like. Alternatively, the initiator group and/or terminator group may be derived from the reaction product of the initiator with another material such as solvent. For example, the initiator may react with toluene to produce a benzyl radical.

Another aspect of the present invention is a copolymer of an unsaturated dicarboxylic monomer and two or more unsaturated EAO polymers (i.e., two or more EAO macromers), wherein the dicarboxylic monomer is the same as heretofore described under the subsection entitled "*Unsaturated Dicarboxylic Monomer*" and each of the EAO polymers is a polymer as heretofore described under the subsection entitled "*Ethylene α-Olefin Polymer*" and each polymer is different from the other. "Different" means that the EAO polymers differ from each other in the identity of one or more of their α-olefin co-monomers, differ in their ethylene content, and/or differ in their number average molecular weights. When the polymers are distinguished by differences in their ethylene content and/or $\overline{M}_n$'s, the values typically differ by at least about 50% (i.e., in the case of two different EAO polymers, $V_1 \geq 1.5 \times V_2$, wherein $V_1$ and $V_2$ are the values of ethylene content or $\overline{M}_n$ for the first and second EAO polymers respectively). For example, the following EAO polymer pairs are considered different: ethylene-butene-1 polymer v. ethylene propylene polymer, ethylene-butene-1 polymer v. ethylene propylene butene-1 polymer, ethylene butene-1 polymer of $\overline{M}_n$=5000 v. ethylene butene-1 polymer of $\overline{M}_n$=25,000, ethylene hexene-1 polymer of $\overline{M}_n$=5000 and 20 mole % ethylene content v. ethylene hexene-1 polymer of $\overline{M}_n$=5000 and 40 mole % ethylene content. Other pairs, triplets, etc. of different EP polymers are readily apparent from the foregoing examples.

The contribution of each of the different EAO polymers incorporated into the copolymer can vary over a wide range. Typically, each polymer is present in an amount of at least about 1 wt. % based on the total weight of the EAO polymers incorporated into the copolymer of the invention. For a pair of EAO polymers, one EAO polymer can represent from about 1 to about 99 wt. % (e.g., from about 20 to about 80 wt. %), typically from about 5 to about 95 wt. % (e.g., from about 30 to about 70 wt. %), and preferably from about 10 to about 90 wt. % (e.g., from about 40 to about 60 wt. %) of the total weight of the two EAO polymers incorporated into the copolymer. The degree of incorporation of each of the EAO polymers into the copolymer product can be determined by $^1$H- and $^{13}$C-NMR.

The copolymers of the present invention derived from two or more different EAO polymers can be represented as a copolymer comprising (A) one or more succinic groups A represented by the formula (VI) above and (B) one or more hydrocarbyl groups B represented by the formula (VII) above, wherein it is understood that the hydrocarbyl groups are derived from each of the different EAO polymers and whose characteristics (e.g., number of branches in the long chain hydrocarbyl group, number of carbon atoms in the —C(R$^1$R$^2$)—C(R$^3$R$^4$)— moiety, etc.) are a statistical average reflecting the degree of incorporation of each of the EAO macromers.

Still another aspect of the present invention is a copolymer of an unsaturated dicarboxylic monomer, one or more unsaturated EAO polymers, and one or more $C_4$ to $C_{30}$ linear aliphatic olefins. The unsaturated dicarboxylic monomer and the EAO polymer are as heretofore described. The aliphatic olefin is represented by the formula:

$$CH_2=CHR^d \qquad (IX)$$

wherein R$^d$ is an alkyl group represented by the formula —(CH$_2$)$_q$CH$_3$ wherein q is 1 to 27. Suitable aliphatic olefins include butene-1, pentene-1, hexene-1, heptene-1, octene-1, nonene-1, decene-1 and so forth up to triacontene-1. Suitable aliphatic olefins include the $C_4$ to $C_{30}$ α-olefins available from Chevron under the tradename Gulftene alpha olefins. Preferred aliphatic olefins are the $C_{10}$ to $C_{30}$ olefins of formula (IX). The preparation and properties of such olefins is disclosed in "Olefins, Higher", D. G. Demianiw, pages 480–499 in *Kirk-Othmer Encyclopedia of Chemical Technoloy*, 3d edition, volume 16 (Wiley-Interscience, New York, 1981).

The contribution of the EAO polymer(s) and the aliphatic olefin(s) incorporated into the copolymer can vary over a wide range. The EAO polymer(s) suitably represents at least about 25 wt. % (e.g., from about 25 to about 99.9 wt. %) of the total weight of the polymer and aliphatic olefin incorporated into the copolymer. Typically, the EAO polymer(s) represent at least about 50 wt. % (e.g., 20 from about 50 to about 99.9 wt. %) of the total weight of polymer and aliphatic olefin incorporated into the copolymer. For the case of incorporation of a single EAO polymer and a single aliphatic olefin, the EAO polymer typically represents from about 50 to about 99.9 wt. % (e.g., from about 60 to about 99 wt. %) and preferably from about 70 to about 99.9 wt. % (e.g., from about 75 to about 99 wt. %) of the total weight of polymer and aliphatic olefin incorporated into the copolymer, and the aliphatic olefin represents the balance. The degree of incorporation of EAO polymer and aliphatic olefin into the copolymer product can be determined by $^{1}$H- and $^{13}$C-NMR.

The copolymers of the present invention derived from an EAO polymer and an aliphatic olefin can be represented as a copolymer comprising (A) one or more succinic groups A wherein A is represented by the formula (VI) above; (B) one or more first hydrocarbyl groups B wherein B is represented by the formula (VII) above; and (C) one or more second hydrocarbyl groups C wherein C is different from B and is a group represented by the formula

$$_{c}\!-\!CH_2CHR^{d}\!-\!_{c'} \qquad (X)$$

wherein $R^d$ is an alkyl group of formula $-(CH_2)_q CH_3$ with q=1 to 27; and wherein a, a', b, b', c and c' are covalent bonding sites, with sites a and a' in each succinic group A being capable of forming covalent bonds with other a and a' sites and with b, b', c and c' sites; with sites b and b' in each first hydrocarbyl group B being capable of forming covalent bonds with other b and b' sites and with a, a', c and c' sites; and with sites c and c' in each second hydrocarbyl group C being capable of forming covalent bonds with other c and c' sites and with a, a', b and b' sites; and wherein at least one succinic group A is covalently bonded to at least one first hydrocarbyl group B or at least one second hydrocarbyl group C; and wherein the copolymer has an average degree of polymerization of at least about 3.

The copolymers derived from an EAO polymer and an aliphatic olefin will contain initiator groups I and terminator groups T, as described above, as a result of the reaction with the free radical initiator used in the polymerization reaction.

Grafted Copolymer

The present invention includes a grafted copolymer formed by grafting the copolymer of the invention with an unsaturated dicarboxylic grafting reactant in the presence of a free radical initiator. The grafted copolymer has succinic groups randomly grafted in and along the hydrocarbyl groups of the starting copolymer, in addition to the succinic groups incorporated into and forming part of the backbone of the starting copolymer.

Suitable unsaturated dicarboxylic grafting reactants include unsaturated dicarboxylic acid producing compounds selected from the group consisting of (i) mono-olefinic $C_4$ to $C_{10}$ dicarboxylic acids having vicinal carboxyl groups (i.e., located on adjacent carbon atoms), wherein at least one, and preferably both, of the carbon atoms on which the carboxyl groups are located forms part of the mono- olefinic bond (i.e., the carbon-carbon double bond), (ii) anhydride derivatives of (i), and mono- and diesters of (i) derived from $C_1$ to $C_{20}$ (preferably $C_1$ to $C_5$) aliphatic alcohols. Suitable grafting reactants include the unsaturated dicarboxylic monomers of formula (II), as set forth above. Exemplary reactants include fumaric acid, itaconic acid, itaconic anhydride, maleic acid, maleic anhydride, chloromaleic acid, chloromaleic anhydride, mesaconic acid, and $C_1$ to $C_5$ alkyl esters of the foregoing; i.e., methyl fumarate, ethyl fumarate, methyl maleate, etc. The preferred grafting reactant is maleic anhydride.

Suitable free radical initiators are those disclosed above in describing the preparation of the copolymer of the invention.

The copolymer and dicarboxylic grafting reactant are reacted in the presence of a free radical initiator at a temperature in the range of from about 140 to 260° C., preferably from about 150 to about 240° C. The reaction can be conducted in solution in a manner as described above for the preparation of the copolymer of the invention. Processes adaptable for use in grafting the copolymer of the invention are also described in U.S. Pat. No. 4,505,834, U.S. Pat. No. 4,863,623, and GB-A-2055852. Alternatively, the grafting reaction can be conducted using a solid or melt process in which the copolymer, dicarboxylic grafting reactant and free radical initiator are brought into contact using masticating or shearing equipment. Solution grafting processes are preferred.

The free radical grafting of the copolymer in solution can be accomplished by adding a suitable amount of the dicarboxylic grafting reactant directly to the copolymer product mixture obtained as described above in the subsection entitled "*Preparation of the Copolymer*" and concurrently or subsequently raising the temperature of the mixture to a grafting temperature (i.e., a temperature above about 140° C.). Alternatively, the preparation of the copolymer and the grafted copolymer can be conducted as discrete reaction steps in separate reaction zones.

Still another alternative is the single-step preparation of grafted copolymer, wherein the EAO polymer is reacted with an excess amount of unsaturated dicarboxylic monomer (e.g., greater than about 5 moles per mole of EAO polymer) in the presence of a free radical initiator under conditions favoring the formation of copolymer (e.g., a reaction temperature below about 100° C.), and, after the EAO polymer has substantially to completely reacted, raising the temperature to above about 140° C. such that the remaining unreacted dicarboxylic monomer acts as a grafting reactant resulting in the formation of grafted copolymer. Additional dicarboxylic monomer and/or free radical initiator can be added as necessary or desired in the grafting step.

Derivatized Copolymer

The present invention includes derivatized copolymers obtained by reacting the copolymers and grafted copolymers of the invention with nucleophilic reactant compounds including, but not limited to, amines, amino alcohols, alcohols, reactive metals, and reactive metal compounds. (Unless expressly stated to the contrary, the use in this and succeeding sections and subsections of the term "copolymer" in reference to the copolymer of the invention also refers to the grafted copolymer of the invention.)

Useful amine compounds for derivatizing the copolymers contain at least one amino group which can react with the succinic groups in the copolymer to form succinamide groups, succinimide groups, and/or amine salts of succinic acid.

Suitable amines include mono- and polyamines containing from about 2 to about 60, preferably about 2 to about 40 (e.g. about 3 to about 20), total carbon atoms and from about 1 to about 12, preferably about 2 to about 12 (e.g., about 3 to about 9) nitrogen atoms in the molecule. The amines may be hydrocarbyl amines or hydrocarbyl amines including other groups (e.g., hydroxy groups, alkoxy groups, amide groups, nitriles, imidazoline groups, and the like), provided these other groups do not substantially interfere with the reaction of the amino groups with the succinic groups in the copolymer of the invention. These amines include aliphatic, cycloaliphatic, and aromatic mono- and polyamines. The monoamines are primary or secondary monoamines, preferably primary amines. Suitable aliphatic monoamines include mono- and dialkylamines, mono- and dialkenylamines, and monoalkylmonoalkenylamines, typically having a total of no more than about 20 carbon atoms.

Exemplary aliphatic monoamines are ethylamine, diethylamine, n-butylamine, di-n-butylamine, laurylamine, dodecylamine and the like. Suitable cycloaliphatic amines include cycloalkylamines, cycloalkenylamines, and dicycloalkylamines, and the like, such as cyclohexylamine, cyclopentylamine, the cyclohexenylamines, dicyclohexylamine, and so forth. Suitable aromatic monoamines include aniline, naphthylamine, p-dodecylaniline, and p-ethoxyaniline.

The polyamines are aliphatic, cycloaliphatic and aromatic polyamines having at least two amino groups, at least one of which is a primary or secondary amino group. Preferred polyamines are those having at least one primary amino group. The polyamines can optionally contain one or more tertiary amino groups in addition to one or more primary and/or secondary amino groups. Among the suitable polyamines are alkylene polyamines (e.g., ethylene polyamines) having from about 2 to about 12 (e.g., from about 2 to about 9), typically from about 3 to about 12 (e.g., from about 3 to about 9 or from about 3 to about 10) nitrogen atoms per molecule, or mixtures of such alkylene polyamines having an average number of nitrogen atoms per molecule corresponding to the foregoing ranges. Exemplary alkylene polyamines include tetraethylene pentamine ("TEPA"), pentaethylene hexamine ("PEHA"), N-(2-aminoethyl)piperazine, di-(1,2-propylene)triamine, and di-(1,3-propylenetriamine). Among the useful alkylene polyamines are commercial mixtures of ethylene polyamines averaging from 5 to 7 nitrogen atoms per molecule available under the tradename E-100 (Dow Chemical) and HPA-X (Union Carbide).

In one embodiment, the alkylene polyamine is a heavy alkylene polyamine which is defined herein as an alkylene polyamine having at least about 7 nitrogen atoms per molecule or mixtures of alkylene polyamines (e.g., a mixture of higher oligomers of alkylene polyamines) having an average of at least about 7 nitrogen atoms per molecule. Exemplary heavy alkylene polyamines include the linear and branched isomers of hexaethylene heptamine, heptaethylene octamine, and hexa-(1,2-propylene)heptamine. A preferred heavy polyamine is a mixture of ethylene polyamines containing essentially no TEPA, at most small amounts of PEHA, and the balance oligomers with more than 6 nitrogens and more branching than conventional commercial polyamine mixtures such as the E-100 and HPA-X mixtures noted in the preceding paragraph.

A useful heavy alkylene polyamine composition is commercially available from Dow Chemical under the tradename HA-2. HA-2 is a mixture of higher boiling ethylene polyamine oligomers and is prepared by distilling out all the lower boiling ethylene polyamine oligomers (light ends) up to and including TEPA. The TEPA content is less than 1 wt. %. Only a small amount of PEHA, less than 25 wt. %, usually 5–15 wt. %, remains in the mixture. The balance is higher nitrogen content oligomers with a great degree of branching. The heavy polyamine preferably contains essentially no oxygen. Typical analysis of HA-2 gives primary nitrogen values of about 7.8 milliequivalents (meq) (e.g., 7.7 to 7.8) of primary amine per gram of polyamine. This calculates to be an equivalent weight (EW) of about 128 grams per equivalent (g/eq). The total nitrogen content is from about 32 to about 33 wt. %. In comparison, conventional commercial polyamine mixtures such as E-100 and HPA-X typically have from about 8.7–8.9 meq of primary amine per gram and a nitrogen content of from about 33 to about 34 wt. %.

Another suitable polyamine is a one-armed amine, which is defined herein as an amine containing an average of one primary amino group and one or more secondary or tertiary amino groups per molecule. The one-armed amine preferably contains one primary amino group and 1 to 10 secondary or tertiary amino groups. Mixtures of such one-armed amines are also suitable. Exemplary one-armed amines are dimethylamino-propylaminopropylamine and polypropylenetetramine with one end substituted with a tallow group and having approximately one primary amine per molecule. Suitable one-armed amines are further described in U.S. Pat. No. 5,643,859.

Other suitable polyamines include polyoxyalkylene polyamines such as those described in U.S. Pat. No. 5,229,022, amidoamines and thioamidoamines as described in U.S. Pat. No. 4,857,217 and U.S. Pat. No. 4,956,107; and aminocyclohexane derivatives as described in U.S. Pat. No. 5,296,560 and U.S. Pat. No. 5,213,698.

Heterocyclic mono- and polyamines can also be used to make derivatives of the copolymer of the invention, including morpholines and aminomorpholines (e.g., N-(3-aminopropylmorpholine), piperazines, N-aminoalkylpiperazines, piperidines, and aminoalkyl piperidines.

Amine-derivatized copolymers can be prepared by reacting the amine compound with the copolymer of the invention dissolved or diluted in an inert organic liquid (e.g., mineral oils) to a concentration of from about 5 to about 95 wt. %. The reaction is generally conducted at about 100 to about 250° C. for about 1 to about 24 hours until the desired degree of conversion is achieved. The heating is preferably carried out to favor formation of imides or a mixture of amides and imides, rather than amides and salts. The relative proportions of the copolymer and the amine can vary considerably depending upon the chosen reactants, the type of bonds formed, and the degree of conversion desired. Nonetheless, the copolymer is generally used in an amount ranging from about 0.1 to about 10, and typically ranging from about 0.2 to about 5, equivalents of succinic groups per equivalent of reactive amino groups. The equivalent weight of the copolymer of the invention is its number average molecular weight divided by the average number of succinic groups therein. As used herein, the term "reactive amino groups" refers to the primary and secondary amino groups in the amine compound, and the equivalent weight of an amine compound is its molecular weight divided by the number of primary and secondary nitrogens in the compound. Accordingly, the equivalent weight and molecular weight of ethylamine are equal, and the equivalent weight of TEPA is one fifth its molecular weight. For polyamines containing both primary and secondary amino groups, the reaction can be, and typically is, run for a time and under conditions to avoid or at least minimize the reaction of the secondary amino groups, which are normally much less reactive with the succinic groups than are the primary amino groups. In such cases, then, the copolymer is generally used in an amount of from about 0.1 to about 10, typically from about 0.2 to about 5, equivalents of succinic groups per equivalent of primary amino groups.

The derivatization reaction is suitably conducted until at least about 10%, of the succinic groups in the copolymer are converted to N-containing groups (e.g., succinimide and/or succinamide groups), and is typically conducted until at least about 50% of the succinic groups are converted. Furthermore, except as provided in the next paragraph, substantial to complete conversion (i.e., from about 70 to about 100% conversion) of the copolymer is preferred. An excess of the amine reactant (e.g., from about 0.5 to about 0.9 equivalent of succinic groups per equivalent of reactive amino groups) is often employed to achieve a high degree of conversion at moderate temperatures (e.g., about 150 to about 210° C.) within a reasonable time (e.g., less than about 12 hours).

Substantial to complete conversion of the succinic groups may not be desirable, however, when the reaction is conducted using a stoichiometric or excess amount of the copolymer with a polyamine containing at least two reactive amino groups per molecule. The resulting derivatized products can have a significant content of copolymer molecules which have been coupled, chain extended, and/or crosslinked together by reaction (e.g., by amidation and/or imidation) with amino groups on the same polyamine molecule. These products can form gels or otherwise tend to have too high viscosity for subsequent treatment and handling. Accordingly, derivatization of the copolymer with polyamines in such circumstances can be terminated before complete conversion (e.g., terminated at no more than about 70% conversion) of the succinic groups, so as to avoid gelation and/or high viscosity.

The degree of conversion can be monitored by removing and measuring the amount of condensation by-product liberated as a result of the derivatization (e.g., the amount of water released by conversion of succinic anhydride to succinimide). Alternatively, the degree of conversion can be determined by measuring the disappearance of the infrared absorption peaks due to the succinic group and/or appearance of the IR peaks due to imide and/or amide groups.

The copolymers can be reacted with alcohols to form esters. The alcohols may be monohydric alcohols, polyhydric alcohols, aromatic hydroxy compounds, unsaturated alcohols, or ether alcohols. As for the amines, the alcohols may contain other polar or reactive groups, provided they do not interfere with the reaction of the alcohols with the succinic groups in the copolymer of the invention. The polyhydric alcohols typically contain from about 2 to about 10 hydroxy radicals per molecule. Suitable polyhydric alcohols include ethylene glycol, diethylene glycol, triethylene glycol, glycerol, pentaerythritol, etc. and mixtures thereof. The copolymers of the invention can be reacted with the alcohols according to conventional esterification techniques. This normally involves heating the copolymer with the alcohol, optionally in the presence of a normally liquid, substantially inert, organic liquid solvent. Temperatures from at least about 100° C. up to the temperature at which one or more of the reactants decompose are used. The temperature is usually within the range of about 100 up to about 300° C., and typically from about 140 to about 250° C. The esterification may optionally be conducted in the presence of an esterification catalyst (e.g., sulfuric acid, p-toluene sulfonic acid, and the like). As for polyamines, at least about 50% conversion of the succinic groups on the copolymer to ester groups is typical, and substantial to complete conversion is preferred. However, substantial to complete conversion may not be desirable when reacting a stoichiometric to excess amount of the copolymer with a polyhydric alcohol, because the products may tend to gel or otherwise be too highly viscous.

The copolymers can also be reacted with amino alcohols (i.e., compounds containing one or more hydroxy groups and one or more primary or secondary amino groups) to form derivatives containing esters and/or N-containing groups. Non-limiting examples of suitable amino alcohols include ethanolamine, diethanolamine, N-hydroxyethyl piperazine, 3-hydroxybutylamine, and N, N, N'-tris-(2-hydroxyethyl)ethylenediamine, tris-(hydroxymethyl) aminomethane ("THAM"), and the like. The copolymers of the invention can be reacted with amino alcohols in amounts and under conditions substantially as set forth above for reacting amines and for reacting alcohols.

The copolymers of the invention can be reacted with reactive metals or reactive metal compounds to form metal salts or metal-containing complexes. Metal salts are formed by reaction of the succinic groups in the copolymer with the reactive metal or metal compounds. Metal complexes are typically achieved by reacting the copolymers with amines, alcohols, and/or amino alcohols as discussed above and also with complex forming reactive metal compounds either during or subsequent to amination and/or esterification. Generally, the compounds of alkali metals, alkaline earth metals, and the transition metals are useful for forming the metal salts and complexes. Suitable compounds include oxides, alkoxides, hydroxides, phenoxides, alkylates (e.g., methylates), nitrates, nitrites, halides, carboxylates, phosphates, phosphites, sulfates, sulfites, carbonates and borates.

Reactive metal compounds useful in preparing salts from the functionalized polymer and/or an amine derivatized polymer as described above include the oxides, hydroxides carbonates, halides, alkylates (e.g., methylates), and phenoxides of the alkali metals, alkaline earth metals, zinc, cadmium, lead, cobalt and nickel. Further disclosure directed to these reactive metal compounds and of processes for preparing the functionalized polymer salts therefrom can be found in U.S. Pat. No. Reissue 26433.

The copolymer can be reacted with any individual amine, alcohol, amino alcohol, reactive metal, reactive metal compound or any combination of two or more of any of these. Furthermore, the copolymer can be reacted with the amines, alcohols, amino alcohols, reactive metals, reactive metal compounds, or their mixtures simultaneously (concurrently) or sequentially in any order.

Post-treatment

Another aspect of the present invention involves the post-treatment of the nitrogen- and ester-containing derivatized copolymers. The processes used for post-treating are analogous to the post-treating processes used for conventional dispersants and viscosity modifiers. Accordingly, the same or similar reaction conditions, ratios of reactants and the like can be used. Thus, the derivatized copolymer can be post-treated with such reagents as urea, thiourea, carbon disulfide, aldehydes, inorganic acids, carboxylic acids, dicarboxylic acid anhydrides, hydrocarbyl substituted succinic anhydrides, nitriles, epoxides, boron compounds, phosphorus compounds and the like.

In one embodiment, the derivatized copolymer can be borated by post-treating the product with a borating agent to obtain a borated product containing at least about 0.1 weight percent of boron based on the total weight of the borated product. The borated product can contain up to about 10 wt. % boron (e.g., from about 3 to about 10 wt. %) but preferably has from about 0.05 to about 2 wt. %, e.g., from about 0.05 to about 0.7 wt. % boron. Suitable borating agents include boron halides, (e.g. boron trifluoride, boron tribromide, boron trichloride), boron acids, and simple esters of the boron acids (e.g., trialkyl borates containing 1 to 8 carbon alkyl groups such as methyl, ethyl, n-octyl, 2-ethylhexyl, etc.).

The boration reaction is typically carried out by adding from about 0.05 to about 5 wt. %, e.g., from about 1 to about 3 wt. % (based on the weight of the derivatized copolymer product) of the borating agent, and heating with stirring at from about 90 to about 250° C., preferably from about 135 to about 190° C. (e.g., from about 140 to about 170° C.), for from about 1 to about 10 hrs. followed by nitrogen stripping in said temperature ranges. The borating agent is preferably boric acid which is most usually added as a slurry to the reaction mixture.

A suitable low sediment process involves borating with a particulate boric acid having a particle size distribution characterized by a Φ value of not greater than about 450. The process is described in U.S. Pat. No. 5,430,105.

In another embodiment, the derivatized copolymer can be post-treated by reaction with a phosphorus-containing agent to introduce phosphorus or phosphorus-containing moieties into the product. Suitable phosphorus-containing agents include phosphorus acids, phosphorus oxides, phosphorus sulfides, phosphorus esters and the like. Suitable inorganic phosphorus compounds include phosphoric acid, phosphorous acid, phosphorus pentoxide, and phosphorus pentasulfide. Suitable organic phosphorus compounds include mono-, di- and trihydrocarbyl phosphates, the hydrocarbylpyrophosphates, and their partial or total sulfur analogs wherein the hydrocarbyl group(s) contain up to about 30 carbon atoms each. Illustrative post-treatments employing phosphorus compounds are described in U.S. Pat. Nos. 3,184,411, 3,342,735, 3,403,102, 3,502,677, 3,511,780, 3,513,093, 4,615,826, and 4,648,980, and in GB-A-1153161 and 2140811.

In still another embodiment, the amine-derivatized polymer can be post-treated by reaction with a low molecular weight dicarboxylic acid acylating agent such as maleic anhydride, maleic acid, fumaric acid, succinic acid, alkenyl or alkyl substituted succinic acids or anhydrides (in which the alkyl or alkenyl substituent has from 1 to about 24 carbon atoms), and the like. The acylating agent is typically reacted with the amine-derivatized polymer at temperatures in the range of from about 80 to about 180° C. for a time ranging from about 0.1 to about 10 hours, optionally in the presence of an inert solvent.

The amine-derivatized polymer can also be post-treated with a high molecular weight dicarboxylic acylating agent including hydrocarbyl substituted dicarboxylic anhydrides and acids, such as succinic anhydrides or acids, having from about 25 to about 500, preferably about 50 to about 400, carbon atoms in the hydrocarbyl substituent. The hydrocarbyl groups are typically aliphatic and include polyalkyl and polyalkenyl groups, which can be derived from a polymer of a $C_2$ to $C_5$ monolefin, the polymer having $\overline{M}_n$ of from about 300 to about 6000, preferably from about 600 to about 5000. A particularly preferred high molecular weight dicarboxylic acylating agent is polyisobutenyl succinic anhydride in which the polyisobutenyl substituent has $\overline{M}_n$ of from about 700 to about 3000.

Suitable acylating agents for post-treating the amine-derivatized polymers also include long chain monocarboxylic acids of formula $R^q$COOH wherein $R^q$ is a hydrocarbyl group having from about 12 to about 400 carbon atoms. Suitable hydrocarbyl groups include those described just above with respect to dicarboxylic acylating agents.

In a further embodiment, the product can be post-treated by reaction with a strong inorganic acid, such as with a mineral acid selected from sulfuric, nitric and hydrochloric acid at a temperature of from about 93 to about 204° C., as described in U.S. Pat. No. 4889646.

The derivatized polymers of the present invention can also be treated with lactones (e.g., ε-caprolactone) as described in U.S. Pat. No. 5,629,434, and with cyclic carbonates as described in U.S. Pat. No. 4,585,566.

Compositions

The copolymers, grafted copolymers, and derivatized copolymers of the invention possess properties (e.g., dispersancy, detergency and/or viscosity index improvement) which make them useful as additives in fuels and in lubricating oils. The additives of the invention are used by incorporation into the lubricating oils and fuels. Incorporation may be done in any convenient way and typically involves dissolution or dispersion of the additives into the oil or fuel in an amount effective for their intended function. The blending into the fuel or oil can occur at room or elevated temperature. Alternatively, the additives can be blended with a suitable oil-soluble solvent/diluent (such as benzene, xylene, toluene, lubricating base oils and petroleum distillates, including the various normally liquid petroleum fuels noted below) to form a concentrate, and then the concentrate can be blended with a lubricating oil or fuel to obtain the final formulation. Such additive concentrates will suitably contain on an active ingredient (AI) basis from about 5 to about 95 weight percent, typically from 10 to about 80 weight percent, more typically from about 20 to about 60 wt. %, and preferably from about 40 to about 50 wt. % additive, based on the total weight of the concentrate.

When the additives of this invention are used in normally liquid petroleum fuels including gasolines and middle distillates boiling from about 65 to about 430° C. such as kerosene, diesel fuels, home heating fuel oil, jet fuels, etc., a concentration of the additives in the fuel in the range of typically from about 0.001 to about 0.5 wt. %, and preferably from about 0.005 to about 0.15 wt. %, based on the total weight of the composition, will usually be employed.

Fuel compositions of this invention can contain other conventional additives in addition to the additive of the invention. These can include anti-knock agents, cetane improvers, metal deactivators, deposit modifiers/preventors, and anti-oxidants.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils, liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, and chlorinated polybutylenes). Other suitable synthetic oils include alkylene oxide polymers, interpolymers and derivatives thereof where the terminal hydroxyl groups have been modified by esterification, etherification, and the like; esters of dicarboxylic acids; esters made from $C_5$ to $C_{12}$ monocarboxylic acids and polyols and polyol ethers such as neopentyl glycol; and silicon-based oils such as the polyalkyl-, polyaryl-, polyalkoxy-, or polyaryloxysiloxane oils and silicate oils.

The additives of the invention are typically employed as detergents, dispersants, and/or multifunctional dispersant-VI improvers. Additives based upon the low molecular weight EAO polymers typically find use as detergents and/or dispersants in lubricating oils, and additives based upon the medium molecular weight EAO polymers typically find use as dispersant-VI improvers. The additives of the invention are used in amounts effective to perform their intended function (e.g., in an amount effective for a dispersant function or effective for a dispersant-VI improving function).

The additives of the present invention may be mixed with other types of conventional additives, each selected to perform at least one desired function. Among the other additives which may be in the lubricating oil formulation are metal containing detergent/inhibitors and anti-wear agents. The metal detergent/inhibitors are generally basic or overbased alkali or alkaline earth metal salts or mixtures thereof (e.g. mixtures of Ca and Mg salts) of one or more organic acids (e.g., sulfonates, naphthenates, phenates and the like). The anti-wear agents are typically oil-soluble zinc dihydrocarbyl dithiophosphates. Other additives which may be employed in the formulation are antioxidants, corrosion inhibitors, pour depressants, friction modifiers, foam inhibitors, demulsifiers, flow improvers, and seal swell control agents.

Conventional dispersants (e.g., succinimides of polyisobutenyl succinic anhydride) and/or conventional VI improvers (e.g., hydrocarbon polymers or polyesters, optionally derivatized to impart dispersancy or some other property, and having $\overline{M}_n$'s of from $10^3$ to $10^6$) can also be employed in addition to the additives of the invention.

These other additives are typically blended into the base oil in amounts which are effective to provide their normal attendant function. Whether used alone or in combination with these other additives, the additives of the present invention are generally employed in an amount of from about 0.01 to about 20 wt. %, and preferably from about 0.1 to about 10 wt. % (e.g., preferably from about 0.1 to about 6 wt. %), based upon the total weight of the composition.

Additive concentrates comprising concentrated solutions of the additives of this invention together with one or more of these other additives can be prepared by mixing the additives into the base oil, wherein the subject additives of this invention can be added in the form of a concentrate as described above. The collective amounts of the subject additive together with other additives is typically from about 10 to about 90 wt. % (e.g., from about 10 to about 80 wt. %), preferably from about 15 to about 75 wt. %, and most preferably from about 25 to about 60 wt. % additives with base oil as the balance. The concentrate will typically be formulated to contain the additives in the amounts necessary to provide the desired concentration in the final formulation when the concentrate is combined with a predetermined amount of base lubricant.

Unless otherwise indicated, all of the weight percents expressed herein are based on the active ingredient content of the additive.

The active ingredient contents expressed herein reflect the AI content of the additives added to (i.e., incorporated into) the foregoing compositions and concentrates. This value can differ from the actual amount of additive present in the compositions and concentrates as a result of additive interactions and/or environmental exposures (e.g., to air) during blending, storage and/or use.

EXAMPLES

The following examples serve only to illustrate the invention, and are not intended to limit the invention's scope. Definitions of some of the terms, tests and materials set forth in the Examples are as follows:

Solvent 100 Neutral ("S100N") oil is a solvent-extracted neutral mineral lubricating oil having a viscosity of 100 Saybolt Seconds Universal ("SSU") at 37.8° C., a viscosity index (ASTM D2270) of 98 and a pour point (ASTM D97) of −18° C.

Solvent 150 Neutral ("S150N") oil is a solvent-extracted neutral mineral lubricating oil having a viscosity of 150 SSU at 37.8° C., a viscosity index (ASTM D2270) of 95 and a pour point (ASTM D97) of −18° C.

Thickening efficiency ("TE") is the ratio of the weight percent of a polyisobutylene (sold as an oil solution by Exxon Chemical Company under the tradename Paratone N), having a Staudinger molecular weight of 20,000, required to thicken S150N mineral oil to a viscosity of 12.4 centistokes at 98.9° C. to the weight percent of a test polymer required to thicken the same oil to the same viscosity at the same temperature.

Kinematic viscosity ("KV") is the viscosity in centistokes measured according to ASTM D445 at a specified temperature (e.g., 100° C.).

Cold cranking simulator ("CCS") viscosity is a high shear viscosity measured in centipoise at low temperature (e.g., −25° C.) using ASTM D5293. CCS viscosity is a measure of a lubricating oil's resistance to cold engine starting.

The temperature-profile ("TP-1") viscosity and yield stress ("YS") of an oil are measured according to ASTM D4684 using a low shear-rate mini-rotary viscometer ("MRV"). In this test, the oil is slow cooled through a standard cycle (i.e., the TP-1 cooling profile) to a specified low temperature (e.g., −30° C.), after which TP-1 viscosity in centipoise and YS in Pascals are determined. TP-1 viscosity and YS are a measure of the oil's low temperature pumpability.

Example 1

100 ml of toluene was charged to a reactor flask equipped with an air-driven stirrer, a nitrogen gas inlet a thermometer and a condenser. 30 grams of an ethylene-1-butene ("EB") polymer prepared via the metallocene-catalyzed polymerization of the corresponding monomers (polymer $\overline{M}_n$=6650; ethylene content=35 wt. %; and olefin distribution=50% vinylidene, 40% trisubstituted, and 10% disubstituted; all values determined by $^1$H-NMR) was dissolved in 100 ml of toluene, followed by the addition of 2.5 grams of maleic anhydride. The solution was sparged with nitrogen to remove oxygen while heating to 90° C. 1 gram of benzoyl peroxide was then added to the solution, which was then maintained at 90° C. under a nitrogen blanket for about 16 hours. The solution was then cooled to room temperature, and the polymer product precipitated by the addition of a large excess of acetone. The precipitated product was washed with acetone, air-dried over several days, and then dried in a vacuum oven for 24 hours at 60° C.

Analysis of the product by $^1$H-NMR showed an absence of olefinic unsaturation and the presence of anhydride groups. Oxygen content determined by elemental analysis of the product was 1.15 wt. % $\overline{M}_n$ and MWD of the product were 11,100 and 3.3 respectively, as determined by GPC.

Examples 2–4

Three polymer products were prepared via the reaction of maleic anhydride with three EB polymer reactants at 95° C. in the presence of benzoyl peroxide, using the procedure set forth in Example 1. The amounts of the reactants employed in each preparation were as follows:

| Example No. | EB polymer* | EB polymer (g) | Maleic Anhydride (g) | Peroxide (g) |
|---|---|---|---|---|
| 2 | $M_n$ = 4030; wt. % E = 41.8; VD = 60.4%, TS = 37.8%, DS = 1.8% | 30 | 4.17 | 1.67 |
| 3 | $M_n$ = 2677; wt. % E = 64; VD = 56.8%, TS = 39.6%, DS = 2.7% | 30 | 6.28 | 2.51 |
| 4 | Equal parts by weight mixture of EB polymers of Examples 2 and 3 | 30 | 5.23 | 2.09 |

* $M_n$ = number average molecular weight.
wt. % E = weight percent of units in the polymer derived from ethylene.
VD = % vinylidene, TS = % trisubstituted olefin, DS = % disubstituted olefin.
All of the foregoing were determined by $^1$H-NMR.

Example 5

5.0 grams of the polymer product of Example 1 (equivalents of succinic groups=1.20 meq. of succinic anhydride) was redissolved in 100 ml of xylene. The solution was heated to a temperature of 40° C., after which 1 gram of 25 wt. % sodium hydroxide in methanol (4.6 mmoles of methoxide) was slowly added, after which the solution was maintained at 40° C. overnight. After cooling the solution to room temperature, the product was precipitated by addition of a large excess of acetone. The product was then dried in a vacuum oven for about 24 hours at 60° C. Elemental Na analysis on the product indicated virtually complete reaction of the anhydride with sodium methoxide, wherein each of the succinic anhydride groups was converted to a mixed sodium monosuccinate-methyl monosuccinate (i.e., 100% conversion).

Example 6—Viscometrics

Portions of the polymer product of Example 1 were redissolved in 95/5 v/v xylene/methanol to obtain a series of polymer solutions having concentrations in the range from 0.125 to 4 grams of polymer per 100 cm$^3$. A similar series of polymer solutions was prepared with the sodium-containing polymer product of Example 5. The reduced viscosities of the polymer solutions were determined from the flow times of the solutions at 25° C. in a standard Ubbelholde viscometer tube using the following equation:

$$\eta_{red}=(t_p-t_s)/t_s c$$

wherein $\eta_{red}$ is the reduced viscosity; c is the polymer concentration in grams/dl; $t_p$ is the flow time of the polymer solution; and $t_s$ is the flow time of the solvent. The reduced viscosities of the solutions were as follows:

| Concentration | Reduced Viscosity (100 cm$^3$/g) | |
|---|---|---|
| (g/100 cm$^3$) | 0% (Ex.1) | 100% (Ex.5) |
| 0.125 | 0.25 | 0.33 |
| 0.25 | 0.26 | 0.35 |
| 0.50 | 0.27 | 0.40 |
| 1.0 | 0.28 | 0.53 |
| 2.0 | 0.32 | 0.96 |
| 4.0 | 0.40 | 9.9 |

The data show a low and relatively constant reduced viscosity for the polymer product of Example 1, but a significant increase in reduced viscosity with increasing concentration for the sodium-containing polymer product. The viscometrics of the Na-containing polymers can be tailored by suitable adjustment of the Na content.

Example 7

5 grams of a polymer product (1.20 meq. of succinic anhydride) prepared using the same procedure and same starting EB polymer as described in Example 1 was dissolved in toluene and 13.1 grams (0.09 mmole; i.e., 0.075 mmole per meq of succinic groups) of triethylene tetramine ("TETA"; obtained from Aldrich Chemical Company) was added in the form of a solution of 0.20 ml TETA in 20 ml of toluene. The mixture was refluxed at 120 ° C. while flushing with nitrogen to remove water for 8 hours, at which time the evolution of water had ceased. The mixture was then cooled to room temperature, and the desired product was precipitated by the addition of a large excess of acetone. The product was then dried in a vacuum oven at 60° C. for 24 hours. The dried product was found to have 0.1 wt. % N.

Examples 8–10

The procedure described in Example 7 was repeated for a series of three reaction mixtures respectively containing 0.025, 0.050 and 0.10 mmole of TETA per meq of succinic groups.

Example 11—Viscometrics

Portions of the polymer product employed in Examples 7–10 to make nitrogen-containing products were redissolved in xylene to obtain a series of polymer solutions having concentrations within the range of from 0.125 to 4 grams of polymer per 100 cm$^3$. A similar series of polymer solutions was prepared using the nitrogen-containing polymer products of Examples 7–10. The reduced viscosities of the polymer solutions were calculated from the flow times of the solutions at 25° C. in a standard Ubbelholde viscometer tube using the method described in Example 6. The reduced viscosities of the solutions are plotted in FIG. 1. The data show a low and relatively constant reduced viscosity for the polymer product of Example 7, but a large increase in reduced viscosity with increasing concentration for the nitrogen-containing polymer products of Examples 7 and 10. Accordingly, the viscosity of the nitrogen-containing polymer can be manipulated by adjusting of the nitrogen level.

Example 12

5 grams of the polymer product of Example 9 was dissolved in 40 ml of toluene, followed by the addition of 5.2 grams (=36 mmoles) of N-(3-propylamino)morpholine ("NAPM"). The mixture was refluxed for 12 hours, and cooled to room temperature, after which the polymer product was precipitated by addition of a large excess of acetone.

The precipitated product was then dried in a vacuum oven at 60° C. for 24 hours.

Example 13—Viscometrics

Figure 2:
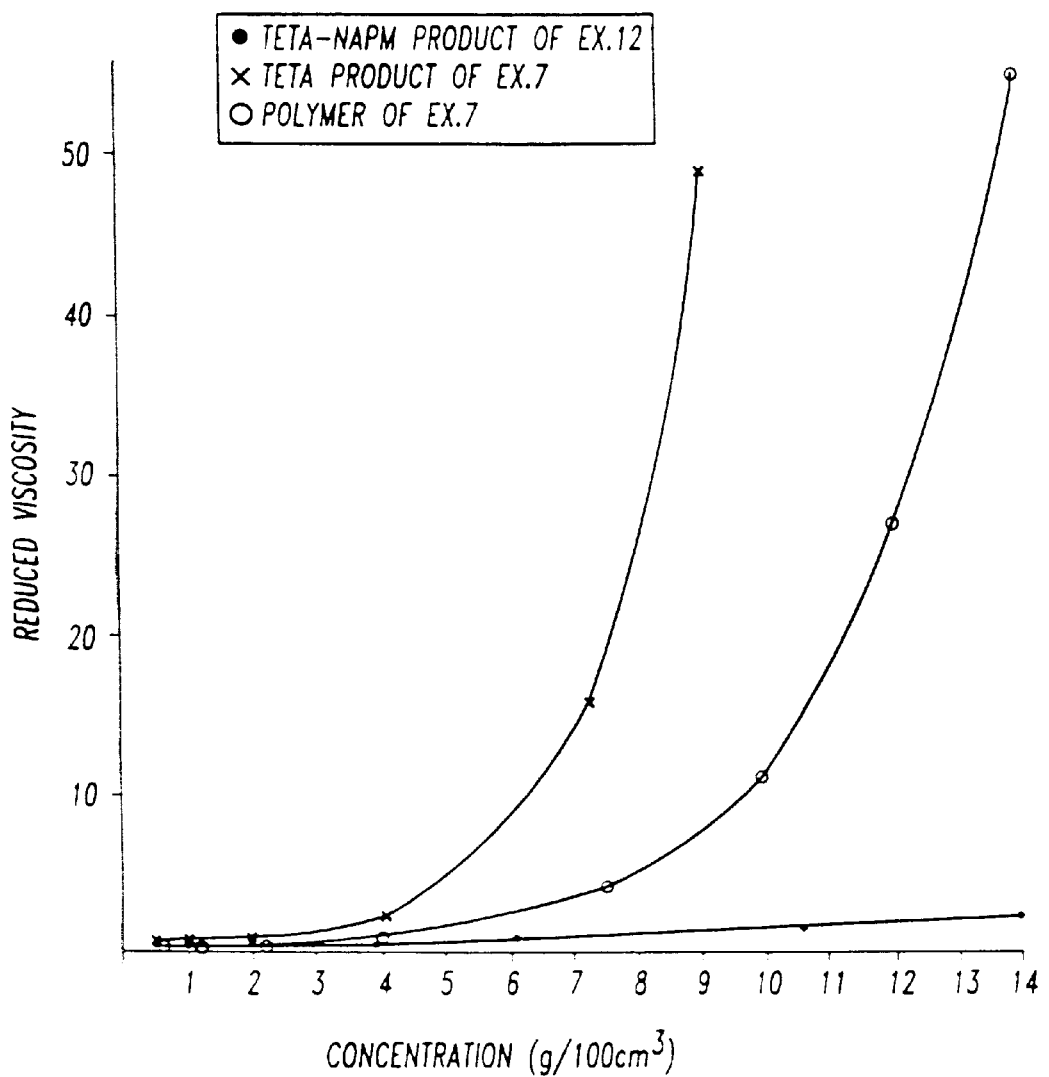
FIG. 2 is a plot of reduced viscosity versus concentration for the polymer solutions described in Example 13.

Xylene solutions of the polymer product of Example 7, the TETA-based product of Example 7, and the TETA-NAPM-based product of Example 12 were prepared at a variety of concentrations ranging from about 0.5 to about 14 grams/100 cm$^3$. The reduced viscosities of the polymer solutions were determined using the method described above in Example 6, and are plotted in FIG. 2.

Example 14

20 grams of the polymer product of Example 2 (4.8 meqs. of succinic groups) was dissolved in 80 ml of toluene, followed by the addition of 5.26 ml of NAPM (=35.9 mmoles). The solution was refluxed overnight, then cooled to room temperature, and the resulting product was precipitated by addition of a large excess of acetone. The precipitated material was dried in a vacuum oven at 60° C. for 24 hours. The precipitated, dried product contained 0.550 wt. % N (Carlo ERBA).

Example 15

20 grams of the polymer product of Example 2 (4.8 meqs of succinic groups) dissolved in 80 ml of toluene was mixed with 8 ml of an 0.5% solution of TETA in toluene (=0.269 mmoles of TETA), and the mixture was reacted as described in Example 7. The TETA-based product was then reacted with 5.26 ml of NAPM as described in Example 12. The dried precipitated product contained 0.547 wt. % N (Carlo ERBA).

Example 16—Viscometrics

SAE 5W-30 lubricating oil formulations containing about 0.08, 0.10 and 0.10 wt. % AI respectively of the EB polymer products of Examples 2, 3 and 4 were prepared using S150N mineral oil as the base oil. The formulations also contained conventional amounts of overbased sulfonate, neutral sulfonate, zinc dialkyldithiophosphate, viscosity index improver, copper and aromatic amine antioxidants, antifoamant, demulsifier, friction modifier and flow improver, wherein each formulation incorporated the same additives in essentially the same proportions. KV at 100° C., CCS viscosity at −25° C., and TP-1 viscosity and YS at −30° C. were then measured for each of the formulations and for an analogous formulation containing about 0.03 wt. % AI of conventional polyisobutenyl ("PIBSA") succinimide dispersant instead of EB polymer product. The results were as follows:

| Formulation Cont'g: | KV | CCS | TP-1 | YS |
|---|---|---|---|---|
| EBMA[1] of Example 2 | 10.47 | 2300 | 8210 | <35 |
| EBMA of Example 3 | 10.59 | 2350 | 906,990 | Solid |
| EBMA of Example 4 | 10.29 | 2350 | 351,860 | Solid |
| PIBSA Succinimide | 10.63 | 3350 | 10,800 | <35 |

[1]EBMA denotes the copolymer product formed from EB polymer and maleic anhydride.

The results show that the product of Example 2 provides significant CCS credits over the PIBSA succinimide in combination with a satisfactory KV, TP-1 and YS. The products of Examples 3 and 4 also exhibit excellent CCS performance, but have relatively poor TP-1 and YS results, attributed to their greater crystallinity which is believed to be due to their relatively high ethylene content. Adjustment of the concentration of such high ethylene-containing products in the formulation, in combination with an adjustment in the choice and/or concentration of flow improver, can ameliorate and improve TP-1 and YS performance.

Example 17—Viscometrics

SAE 5W-30 formulations respectively containing about 0.9 wt. % AI of the products of Examples 14 and 15 were prepared using as the base oil a mixture composed of about 90 parts by weight S100N oil and about 10 parts by weight S150N oil. The formulations also contained conventional amounts of viscosity modifier and flow improver, each formulation incorporating the same additives in the same proportions. KV at 100° C., CCS viscosity at −25° C., TP-1 viscosity and YS at −30° C., and TE were then measured for each of the formulations and for an analogous formulation containing about 1.35 wt. % AI of a conventional PIBSA succinimide dispersant. The results are as follows:

| Formulation Cont'g Product of: | KV | CCS | TP-1 | YS | TE |
|---|---|---|---|---|---|
| Example 14 | 10.27 | 2270 | 7870 | <35 | 0.43 |
| Example 15 | 10.33 | 2300 | 8110 | <35 | 0.45 |
| PIBSA Succinimide | 10.84 | 2500 | 7500 | <35 | 0.1 |

What is claimed is:

1. A copolymer comprising units of an unsaturated dicarboxylic monomer and an unsaturated ethylene α-olefin polymer which comprises units of ethylene and at least one α-olefin represented by the formula CH$_2$=CHR$^a$, wherein R$^a$ is a C$_1$ to C$_{18}$ linear alkyl group or a C$_3$ to C$_{18}$ branched alkyl group; wherein the ethylene α-olefin polymer has a number average molecular weight of from about 500 to about 100,000, and at least about 30% of said unsaturation in the ethylene α-olefin polymer is terminal vinylidene, and less than about 40% of said unsaturation in the ethylene α-olefin polymer is terminal vinyl.

2. The copolymer according to claim 1, wherein the unsaturated dicarboxylic monomer is represented by the formula:

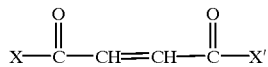

wherein X and X' are each independently selected from the group consisting of —OR$^b$ and halogen, wherein R$^b$ is H or C$_1$ to C$_{20}$ alkyl, or X and X' are taken together to form cyclic —O—.

3. The copolymer according to claim 2, wherein the unsaturated dicarboxylic monomer comprises maleic anhydride.

4. The copolymer according to claim 1, wherein the ethylene α-olefin polymer has from about 15 to about 90 mole percent units derived from ethylene.

5. The copolymer according to claim 1, wherein at least about 50% of the unsaturation in the ethylene α-olefin polymer is vinylidene.

6. The copolymer according to claim 1, wherein the α-olefin is selected from the group consisting of propylene, butene-1, and mixtures thereof.

7. The copolymer according to claim 1, further comprising units of a second ethylene α-olefin polymer which comprises units derived from ethylene and at least one α-olefin represented by the formula $CH_2=CHR^{a'}$, wherein $R^{a'}$ is a $C_1$ to $C_{18}$ linear alkyl group or a $C_3$ to $C_{18}$ branched alkyl group; wherein the second ethylene α-olefin polymer has a number average molecular weight of from about 500 to about 100,000, and at least about 30% of the unsaturation in the second ethylene α-olefin polymer is vinylidene; and wherein (i) the second ethylene α-olefin is derived from at least one α-olefin that is not incorporated into the first ethylene α-olefin polymer, (ii) the molar ethylene content of the second ethylene α-olefin polymer differs from the molar ethylene content of the first ethylene α-olefin polymer, (iii) the number average molecular weight of the second ethylene α-olefin polymer differs from the number average molecular weight of the first ethylene α-olefin polymer, or (iv) any combination of (i), (ii), and (iii).

8. The copolymer according to claim 1, wherein the copolymer further comprises units of a co-monomer comprising an aliphatic olefin represented by the formula $CH_2=CHR^d$, wherein $R^d$ is an alkyl group represented by the formula $-(CH_2)_qCH_3$ and q is 1 to 27.

9. The copolymer according to claim 1, wherein the ethylene α-olefin polymer has a number average molecular weight of from about 500 to 20,000.

10. The copolymer according to claim 1, wherein the ethylene α-olefin polymer has a number average molecular weight of from about 20,000 to about 100,000.

11. A derivatized copolymer prepared by reacting the copolymer according to claim 1 and a nucleophilic reactant selected from the group consisting of monoamines, polyamines, monoalcohols, polyols, amino alcohols, reactant metal compounds and mixtures thereof.

12. The derivatized copolymer according to claim 11, wherein the nucleophilic reactant comprises a polyamine.

13. The derivatized copolymer according to claim 12, wherein said unsaturated dicarboxylic monomer has been converted to succinic groups and at least about 10% of said succinic groups have formed N-containing groups.

14. The derivatized copolymer according to claim 11, wherein the ethylene α-olefin polymer has a number average molecular weight of from about 500 to about 20,000.

15. The derivatized copolymer according to claim 11, wherein the ethylene α-olefin polymer has a number average molecular weight of from about 20,000 to about 100,000.

16. A grafted copolymer prepared by reacting the copolymer according to claim 1 with an unsaturated dicarboxylic grafting reactant in the presence of a free radical initiator.

17. The grafted copolymer according to claim 16, further reacted with a nucleophilic reactant to obtain a grafted and derivatized copolymer, wherein the nucleophilic reactant is selected from monoamines, polyamines, monoalcohols, polyols, amino alcohols, reactant metal compounds and mixtures thereof.

18. The grafted and derivatized copolymer according to claim 17, wherein the ethylene α-olefin polymer has a number average molecular weight of from about 20,000 to about 100,000.

19. A product prepared by a process comprising polymerizing an unsaturated dicarboxylic reactant with an unsaturated polymer reactant in the presence of a free radical initiator at a temperature in the range of from about 20 to about 140° C., wherein the unsaturated polymer reactant comprises an ethylene α-olefin polymer comprising units of ethylene and at least one α-olefin represented by the formula $CH_2=CHR^a$, wherein $R^a$ is a $C_1$ to $C_{18}$ linear alkyl group or a $C_3$ to $C_{18}$ branched alkyl group; wherein the ethylene α-olefin polymer has a number average molecular weight of from about 500 to about 100,000, and at least about 30% of said unsaturation in the ethylene α-olefin polymer is terminal vinylidene, and less than about 40% of the unsaturation in said ethylene α-olefin polymer is terminal vinyl.

20. The product according to claim 19, wherein the unsaturated dicarboxylic monomer is represented by the formula:

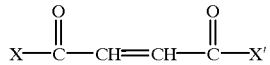

wherein X and X' are each independently selected from the group consisting of $-OR^b$ and halogen, wherein $R^b$ is H or $C_1$ to $C_{20}$ alkyl, or X and X' are taken together to form cyclic $-O-$.

21. The product according to claim 19, wherein the unsaturated dicarboxylic monomer comprises maleic anhydride.

22. The product according to claim 19, wherein the polymer reactant further comprises a second ethylene α-olefin polymer in admixture with the first ethylene α-olefin polymer, the second polymer comprising units of ethylene and at least one α-olefin represented by the formula $CH_2=CHR^{a'}$ wherein $R^{a'}$ is a $C_1$ to $C_{18}$ linear alkyl group or a $C_3$ to $C_{18}$ branched alkyl group; wherein the second ethylene α-olefin polymer has a number average molecular weight of from about 500 to about 100,000, and at least about 30% of the unsaturation in the second ethylene α-olefin polymer is terminal vinylidene; and wherein (i) the second ethylene α-olefin is derived from at least one α-olefin that is not incorporated into the first ethylene α-olefin polymer, (ii) the molar ethylene content of the second ethylene α-olefin polymer differs from the molar ethylene content of the first ethylene α-olefin polymer, (iii) the number average molecular weight of the second ethylene α-olefin polymer differs from the number average molecular weight of the first ethylene α-olefin polymer, or (iv) any combination of (i), (ii), and (iii).

23. The product according to claim 19, wherein the polymer reactant further comprises an aliphatic olefin in admixture with the ethylene α-olefin polymer, the aliphatic olefin represented by the formula $CH_2=CHR^d$, wherein $R^d$ is an alkyl group represented by the formula $-(CH_2)_qCH_3$ and q is 1 to 27.

24. A derivatized product prepared by reacting the product according to claim 19 and a nucleophilic reactant selected from the group consisting of monoamines, polyamines, monoalcohols, polyols, amino alcohols, reactant metal compounds and mixtures thereof.

25. The derivatized product according to claim 24, wherein the ethylene α-olefin polymer has a number average molecular weight of from about 500 to about 20,000.

26. The derivatized product according to claim 24, wherein the ethylene α-olefin polymer has a number average molecular weight of from about 20,000 to about 100,000.

27. A lubricating oil composition comprising base oil and the copolymer according to claim 1.

28. A lubricating oil composition prepared by blending base oil and the copolymer according to claim 1.

29. A lubricating oil composition comprising base oil and the derivatized copolymer according to claim 11.

30. A lubricating oil composition prepared by blending base oil and the derivatized copolymer according to claim 11.

31. A lubricating oil composition comprising base oil and the product according to claim 19.

32. A lubricating oil composition prepared by blending base oil and the product according to claim 19.

33. A lubricating oil composition comprising base oil and the derivatized product according to claim 24.

34. A lubricating oil composition prepared by blending base oil and the derivatized product according to claim 24.

35. A fuel composition comprising a liquid petroleum fuel and the derivatized polymer according to claim 11, wherein the ethylene α-olefin polymer has a number average molecular weight of from about 500 to about 4,000.

36. A process comprising polymerizing an unsaturated dicarboxylic reactant with an unsaturated polymer reactant in the presence of a free radical initiator at a temperature in the range of from about 20 to about 140° C., wherein the unsaturated polymer reactant comprises an ethylene α-olefin polymer comprising units of ethylene and at least one α-olefin represented by the formula $CH_2=CHR^a$, wherein $R^a$ is a $C_1$ to $C_{18}$ linear alkyl group or a $C_3$ to $C_{18}$ branched alkyl group; wherein the ethylene α-olefin polymer has a number average molecular weight of from about 500 to about 100,000, and at least about 30% of the unsaturation in said ethylene α-olefin polymer is terminal vinylidene, and less than about 40% of the unsaturation in said ethylene α-olefin polymer is terminal vinyl.

* * * * *